United States Patent
Tai

(10) Patent No.: US 6,275,322 B1
(45) Date of Patent: Aug. 14, 2001

(54) MICHELSON PHASE SHIFTER INTERLEAVER/DEINTERLEAVERS

(75) Inventor: Kuochou Tai, Freemont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/473,314

(22) Filed: Dec. 28, 1999

Related U.S. Application Data

(63) Continuation-in-part of application No. 09/342,892, filed on Jun. 29, 1999, now Pat. No. 6,169,626, and a continuation-in-part of application No. 09/328,037, filed on Jun. 8, 1999.

(51) Int. Cl.[7] ............................................. G02F 1/01
(52) U.S. Cl. .................... 359/279; 359/237; 359/618; 385/2
(58) Field of Search .................... 359/279, 237, 359/238, 239, 618, 629; 385/2, 3, 8, 122, 36, 27

(56) References Cited

U.S. PATENT DOCUMENTS

| | | | |
|---|---|---|---|
| 4,464,022 | 8/1984 | Emkey | 350/377 |
| 4,474,434 | 10/1984 | Carlsen et al. | 350/381 |
| 4,474,435 | 10/1984 | Carlsen et al. | 350/381 |
| 4,514,046 | 4/1985 | Carlsen et al. | 350/385 |
| 4,566,761 | 1/1986 | Carlsen et al. | 350/401 |
| 4,685,773 | 8/1987 | Carlsen et al. | 350/401 |
| 5,204,771 | 4/1993 | Koga | 359/281 |
| 5,333,144 * | 6/1994 | Liedenbaum et al. | 372/29 |
| 5,471,340 | 11/1995 | Cheng et al. | 359/281 |
| 5,488,500 | 1/1996 | Glance | 359/127 |
| 5,611,004 | 3/1997 | Chang et al. | 385/11 |
| 5,694,233 | 12/1997 | Wu et al. | 359/117 |
| 5,712,717 | 1/1998 | Hamel et al. | 385/24 |
| 5,724,165 | 3/1998 | Wu | 359/117 |
| 5,737,104 | 4/1998 | Lee et al. | 359/124 |
| 5,764,825 | 6/1998 | Mugino et al. | 385/24 |
| 5,778,118 | 7/1998 | Sridhar | 385/24 |
| 5,808,763 | 9/1998 | Duck et al. | 359/127 |
| 5,822,095 | 10/1998 | Taga et al. | 359/127 |
| 5,835,517 | 11/1998 | Jayaraman et al. | 372/50 |
| 5,852,505 | 12/1998 | Li | 359/118 |
| 5,867,291 | 2/1999 | Wu et al. | 359/124 |
| 5,915,051 | 6/1999 | Damask et al. | 385/16 |
| 5,926,587 | 7/1999 | Chen et al. | 385/14 |
| 5,930,039 | 7/1999 | Li et al. | 359/484 |
| 5,955,992 * | 9/1999 | Shattil | 342/375 |
| 5,974,205 | 10/1999 | Chang | 385/11 |
| 6,002,503 | 12/1999 | Mizrahi | 359/124 |
| 6,061,484 | 5/2000 | Jones et al. | 385/24 |

OTHER PUBLICATIONS

E.O. Ammann, "Synthesis of Optical Birefringent Networks", Progress in Optics, 1971, pp. 123–177, vol. IX, North–Holland Publishing Company, Amsterdam.

Shaoping Bian, Kebin Xu, & Jing Hong, "Optical Perfect Shuttle Using Wollaston Prisms", Applied Optics, Jan. 10, 1991; pp. 173–4, vol. 30, No. 2, USA.

Jack L. Jewell, S.L. McCall, Y.H. Lee, A. Scherer, A.C. Gossard, & J.H. English, "Optical Computing and Related Microoptic Devices", Applied Optics, Dec. 1, 1990, pp. 5050–5053, vol. 29, No. 34, USA.

(List continued on next page.)

Primary Examiner—Georgia Epps
Assistant Examiner—Tim Thompson
(74) Attorney, Agent, or Firm—Lacasse & Associates; Randy W. Lacasse; Kevin E. Greene

(57) ABSTRACT

Interleavers and deinterleavers for filtering optical signals are described. The interleaver separates subsets of channels. The deinterleavers mix subsets of channels. Interleavers and deinterleavers can be used to increase the bandwidth of an optical network. The interleavers and deinterleavers can be used to interface components designed for a first channel spacing to components designed for a second channel spacing.

51 Claims, 19 Drawing Sheets

OTHER PUBLICATIONS

Miles Murdocca, "Connection Routing for Microoptic Systems", Applied Optics, Mar. 10, 1990, pp. 1106–1110, vol. 29, No. 8, USA.

Kazuhiro Noguchi, Toshikazu Sakano, & Takao Matsumoto, "A Rearrangeable Multichannel Free–Space Optical Switch Based on Multistage Network Configuration", Journal of Lightwave Technology, Dec. 1991, pp. 1726–1732, vol. 9, No. 12, USA.

K. Shiraishi, T. Sato, & S. Kawakami, "Experimental Verification of a Form–Birefringent Polarization Splitter", Applied Physics Letters, Jan. 21, 1991, pp. 211–212, vol. 58, No. 3, USA.

Masataka Shirasaki & Kunihiko Asama, "Compact Optical Isolator for Fibers Using Birefringent Wedges", Applied Optics, Dec. 1, 1982, pp. 4296–4299, vol. 21, No. 23, USA.

E.O. Ammann, "Synthesis of Electro–Optic Shutters having a Prescribed Transmission vs Voltage Characteristic", Journal of the Optical Society of America, Aug. 1966, pp. 1081–1088, vol. 56, No. 8, USA.

Benjamin B. Dingel & Masayuki Izutsu, "Multifunction optical filter with a Michelson–Gires–Tournois interferometer for wavelength–division–multiplexed network system applications", Optics Letters; Jul. 15, 1998; pp. 1099–1101, vol. 23, No. 14, USA.

Benjamin B. Dingel & Tadashi Aruga, "Properties of a Novel Noncascaded Type, Easy–to–Design, Ripple–Free Optical Bandpass Filter", Journal of Lightwave Technology, Aug. 1999, pp. 1461–1469, vol. 17, No. 8, USA.

S.E. Harris, E.O. Ammann & I.C. Chang, "Optical Network Synthesis Using Birefringent Crystals", Journal of the Optical Society of America, Oct. 1964, pp. 1267–1279, vol. 54, No. 10, USA.

Amon Yariv & Pochi Yeh, "Jones Calculus and its Application to Birefringent Optical Systems", Optical Waves in Crystals, 1984, pp. 121–154, John Wiley & Sons, Inc., Canada.

\* cited by examiner

MICHELSON PHASE SHIFTER INTERLEAVER/DEINTERLEAVERS

The present U.S. patent application is a continuation-in-part of U.S. patent application Ser. No. 09/342,892, now U.S. Pat. No. 6,169,626, entitled "OPTICAL SIGNAL INTERLEAVER," by Jye-Hong Chen and Kuochou Tai, which was filed Jun. 29, 1999 and a continuation-in-part of U.S. patent application Ser. No. 09/328,037 entitled "MULTI-PLATE COMB FILTERS AND APPLICATIONS THEREFOR" by Kuochou Tai and Bo Cai, which was filed Jun. 8, 1999.

FIELD OF THE INVENTION

The invention relates to optical signal communications. More particularly, the invention relates to an interleaver/deinterleavers for use with multiple optical channels.

BACKGROUND OF THE INVENTION

As telecommunications usage increases as a result of, for example, increased Internet usage, increased types of communications, population growth, telecommunications providers are required to provide greater voice- and data-carrying capacity. In order to reduce cost and the amount of time required to provide the increased capacity wavelength division multiplexing (WDM) and dense wavelength division multiplexing (DWDM) have been developed, which provide increased capacity without requiring new fiber optic cables.

WDM and DWDM technologies combine multiple optical signals into a single fiber by transporting each signal on a different optical wavelength or channel. Multiplexing and demultiplexing of optical channels is typically accomplished with thin film optical filters. However, multiple layers of film are required to multiplex and demultiplex multiple channels, which increases the cost and complexity of a component. Another disadvantage of multiple layers of thin film for filtering is that the thin films break down over time, especially when operating under high power conditions.

What is needed is an improved optical device for use with WDM and/or DWDM optical signals.

SUMMARY OF THE INVENTION

Michelson phase shifter interleaver/deinterleavers are described. The interleaver/deinterleavers include a beam splitter to split an input optical signal into a first sub-beam and a second sub-beam, an etalon coupled to receive the first sub-beam and a non-linear phase shifter coupled to receive the second sub-beam. In one embodiment, the etalon has a reflective surface and an air gap with a tuning plate disposed within the gap. The reflective surface reflects signals passed through the air gap. The phase shifter modifies the phase of the second sub-beam. The modified phase of the second sub-beam causes constructive and destructive optical interference between the reflected first sub-beam and the reflected second sub-beam to cause a first subset of signals from the input optical beam to be directed to a first port and the second subset of signals from the input optical beam to be directed to a second port.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
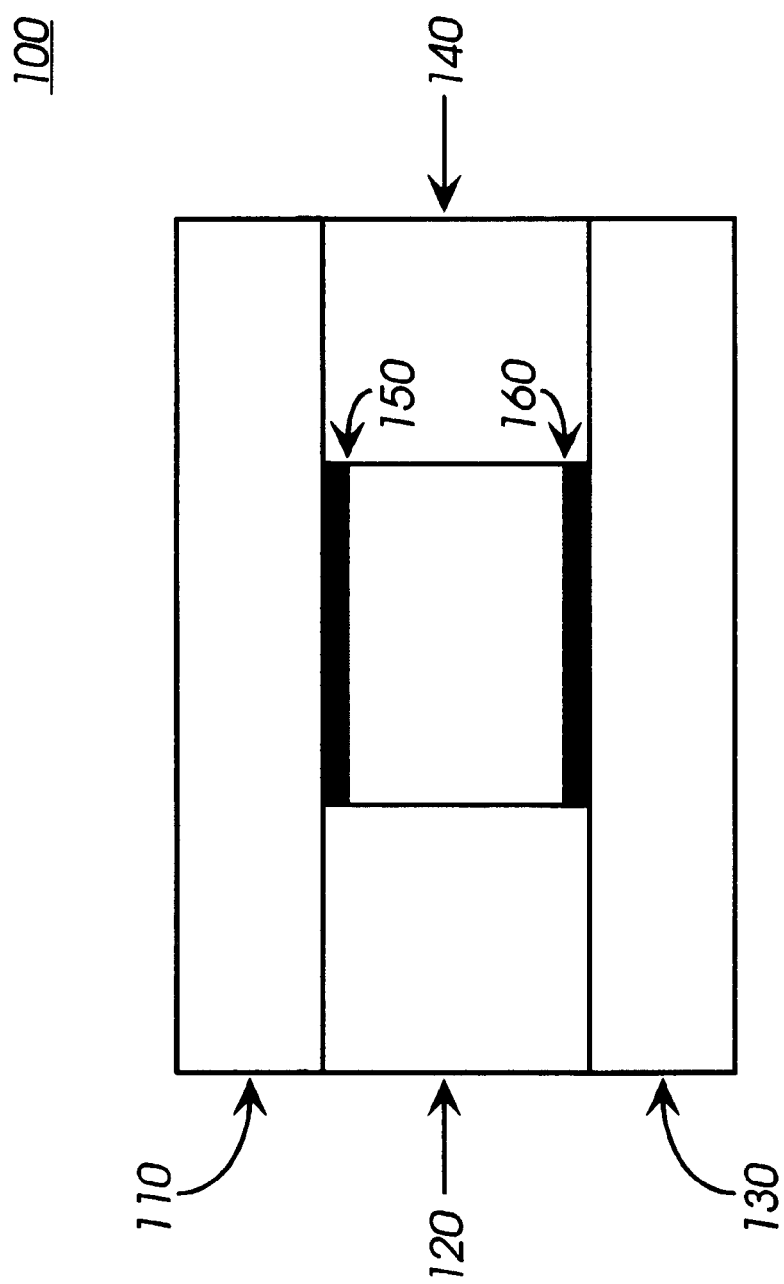
FIG. 1 illustrates one embodiment of a Fabry-Perot Phase Shifter (FPPS).

Michelson phase shifter interleaver/deinterleavers are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Interleavers and deinterleavers for filtering optical signals are described. The interleaver separates subsets of channels. The deinterleavers mix subsets of channels. Interleavers and deinterleavers can be used to increase the bandwidth of an optical network. The interleavers and deinterleavers can be used to interface components designed for a first channel spacing to components designed for a second channel spacing.

The interleaver/deinterleavers described include Michelson phase shifter components. In one embodiment, a Fabry-Perot phase shifter (FPPS) provides phase shifting for an optical signal and a Michelson interferometer with a Fabry-Perot etalon provides a linear phase response. Combination of the FPPS and the Michelson interferometer provide sufficient passband width and isolation to operate as an interleaver/deinterleaver.

In one embodiment, the components of the interleaver/deinterleavers (e.g., etalons, beam splitters) are assembled by placing highly polished glass material in contact with one another such that the contact is maintained by atomic force. Contact that is maintained by atomic force is referred to as "optical contact," which is directly through atomic bonding force between the two flat surfaces. The components of the interleaver/deinterleavers are coupled together in a similar manner. In alternate embodiments, one or more component are coupled with epoxy. However, use of atomic force to maintain optical coupling provides more accurate component dimensions and optical path lengths as compared to epoxy.

The more accurate component dimensions and optical path lengths provide increased performance, for example, by allowing better thermal performance. Also, coupling with atomic force reduces the effects of temperature on the interleaver/deinterleavers. Because epoxy expands at a different rate than optical components over a range of temperatures, expansion and contraction of component dimensions is better matched when the components are maintained with atomic force as compared to epoxy. In one embodiment, the phase matching condition between the two arms of the interleaver/deinterleavers is maintained to within 10 nm over a range of temperatures to give athermal characteristics with sufficient channel isolation (e.g., 25 dB).

In one embodiment, the interleaver/deinterleavers include a tuning plate. The tuning plate provides phase adjustment of the interleaver/deinterleavers. In one embodiment, the tuning plate is used for step, or course, tuning and for angle, or fine tuning of the phase response of the interleaver/deinterleaver. As the tuning plate is rotated the length of the optical path through which the optical signals pass changes, thereby changing the phase response of the interleaver/deinterleaver.

The tuning plate provides improved thermal performance as well as improved optical performance. Improved thermal performance is provided because the amount of the material through which the optical signal passes can be better matched between the two optical paths through which signals pass. Better matching results in more consistent expansion and contraction in response to operation. Improved optical performance is provided because the interleaver/deinterleavers can be tuned with greater resolution as compared to interleaver/deinterleavers without tuning plates.

FIG. 1 illustrates one embodiment of a Fabry-Perot Phase Shifter. As illustrated in FIG. 1, a Fabry-Perot Phase Shifter (FPPS) 100 is a one-sided Fabry-Perot etalon having partially reflective front material 160 and highly reflective back material 150. As described in greater detail below, the phase and intensity response of FPPS 100 is wavelength dependent.

In one embodiment, FPPS 100 includes front plate 130, back plate 110, and spacers 120 and 140. FPPS 100 also includes front reflective material 160 and back reflective material 150. In one embodiment, front plate 130 and back plate 110 are glass (e.g., $SiO_2$) plates and spacers 120 and 140 are made of ultra-low expansion (ULE) material. Other materials can be used.

In one embodiment, front reflective material 160 has a reflectivity in the range of 10% to 25% reflective (e.g., 15±1%, 19.6%); however, front reflective materials having other reflectivities can also be used. Thus, front reflective material 160 reflects 10% to 25% of the optical signal that passes through front glass plate 130. The remaining 75% to 90% of the signal is passed through front reflective material 160 through the gap between front reflective material 160 to back reflective material 150.

In one embodiment, the gap between front glass plate 130 and back glass plate 110 is air filled. Having an air gap in FPPS 100 allows FPPS 100 to operate on high power signals without thermal expansion or other thermal effects because the signals pass through air rather than the materials of FPPS 100. In one embodiment, back reflective material 150 is 90% to 100% reflective (e.g., 99.8%). Thus, back reflective material 150 reflects substantially all of the optical signals passed by front reflective material 160. The light reflected by back reflective material 150 is passed back through front reflective material 160 and front plate 130.

Figure 2:
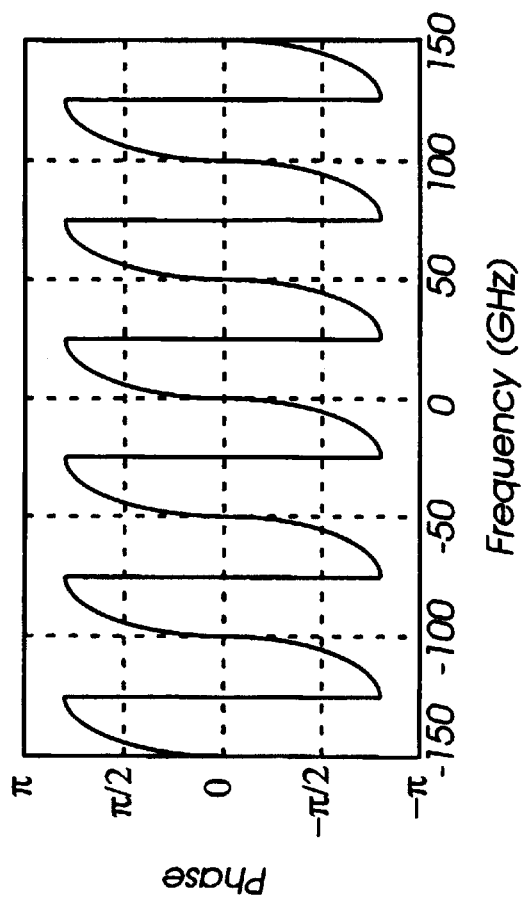
FIG. 2 is the phase and intensity response of reflected light from a FPPS as illustrated in FIG. 1.
Figure 2:
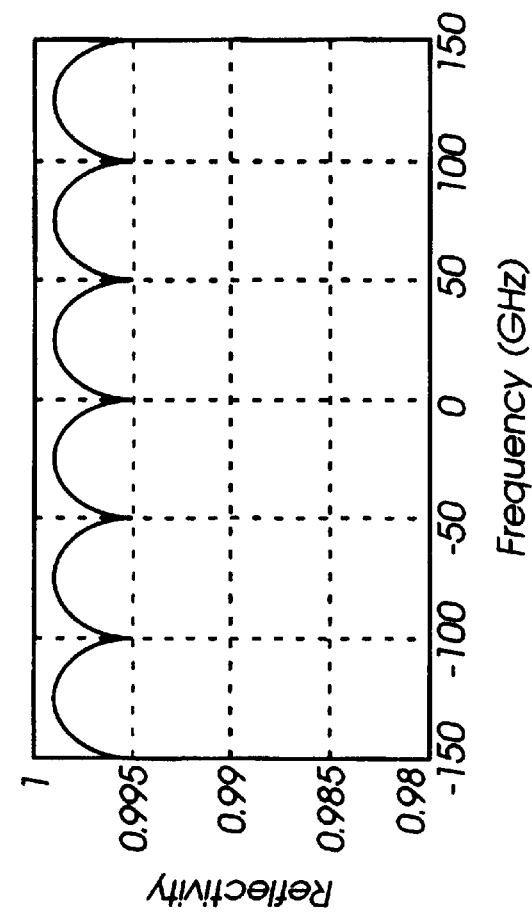

FIG. 2 is the phase and intensity response of reflected light from a FPPS as illustrated in FIG. 1. The FPPS having a response as illustrated in FIG. 2 has a front reflectivity of 19.6% and a back reflectivity of 99.8%. Other front and back reflectivities can be used to provide other phase and intensity responses.

As illustrated in FIG. 2, the FPPS provides phase modulation with some attenuation. Because the phase and intensity response of a FPPS is wavelength dependent, certain frequencies are attenuated more than other frequencies. However, the attenuation provided by the FPPS of FIG. 1 is not sufficient to provide channel filtering. Thus, the FPPS of FIG. 1 alone is not sufficient to operate as an interleaver/deinterleaver.

Figure 3:
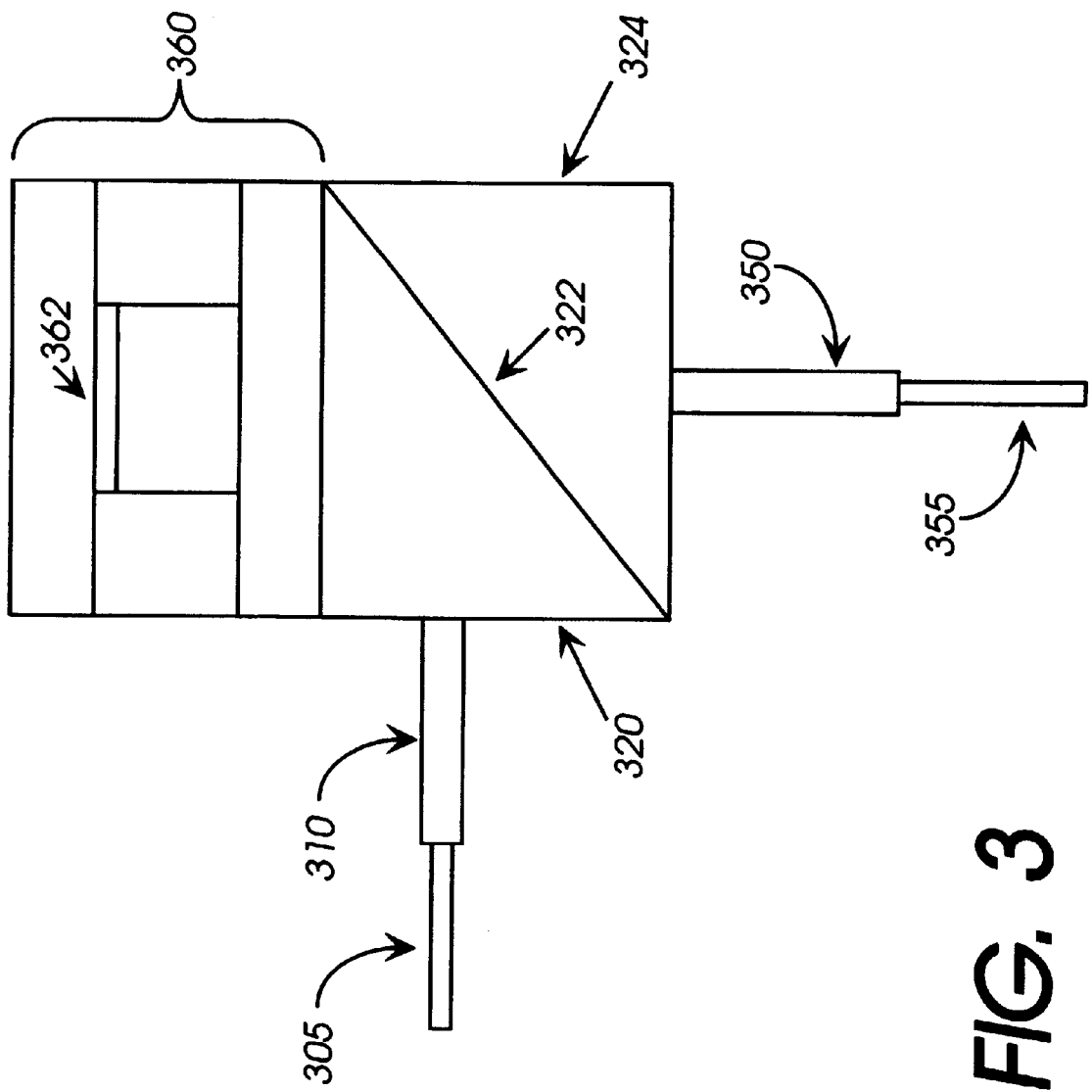
FIG. 3 illustrates one embodiment of an unequal path Michelson interferometer.

FIG. 3 illustrates one embodiment of an unequal path Michelson interferometer. As illustrated in FIG. 4 below, the phase response is linear, which does not provide sufficient pass bands and rejection bands to filter optical signals.

Optical fiber 305 receives, from an external source (not shown in FIG. 3), optical signals corresponding to one or more frequencies. Collimator 310 collimates the optical signals and passes the optical signals to beam splitter cube 320. Other types of beam splitters, for example, mirror beam splitters can also be used. Beam splitter cube 320 splits the beam received via optical fiber 305 and collimator 310 into a first sub-beam and a second sub-beam.

The first sub-beam is reflected by beam splitter cube interface 322 to etalon 360. Etalon 360 includes reflecting surface 362 that reflects the first sub-beam to collimator 350. In one embodiment, etalon 360 also includes a front reflecting surface (not shown in FIG. 3). The second sub-beam passes through beam splitter cube interface 322 to back surface 324. The second sub-beam is reflected by back surface 324 to beam splitter cube interface 322, which reflects the second sub-beam to collimator 350.

Constructive and destructive light interference between the first sub-beam and the second sub-beam at beam splitter cube interface 322 cause the output signal to vary between being at or near full input strength to being greatly attenuated. The combined output signal is carried by optical fiber 355.

Figure 4A:
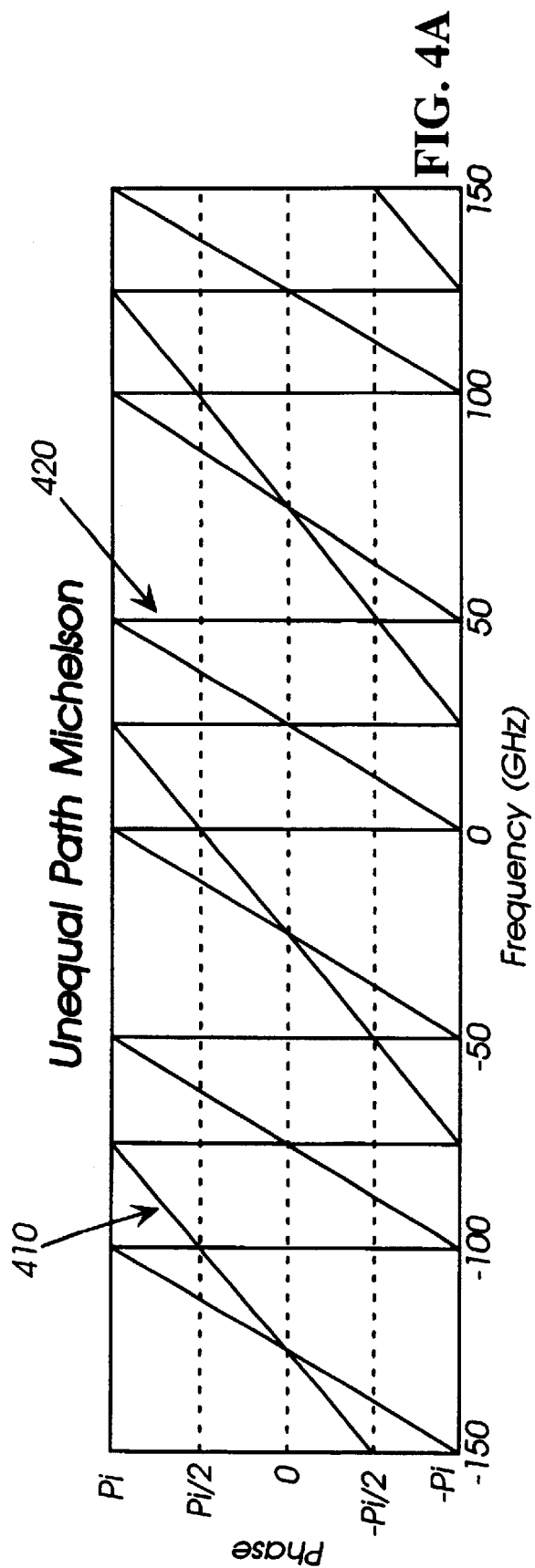
FIGS. 4a and 4b are the phase and intensity response of reflected light from an unequal path Michelson interferometer as illustrated in FIG. 3.
Figure 4B:
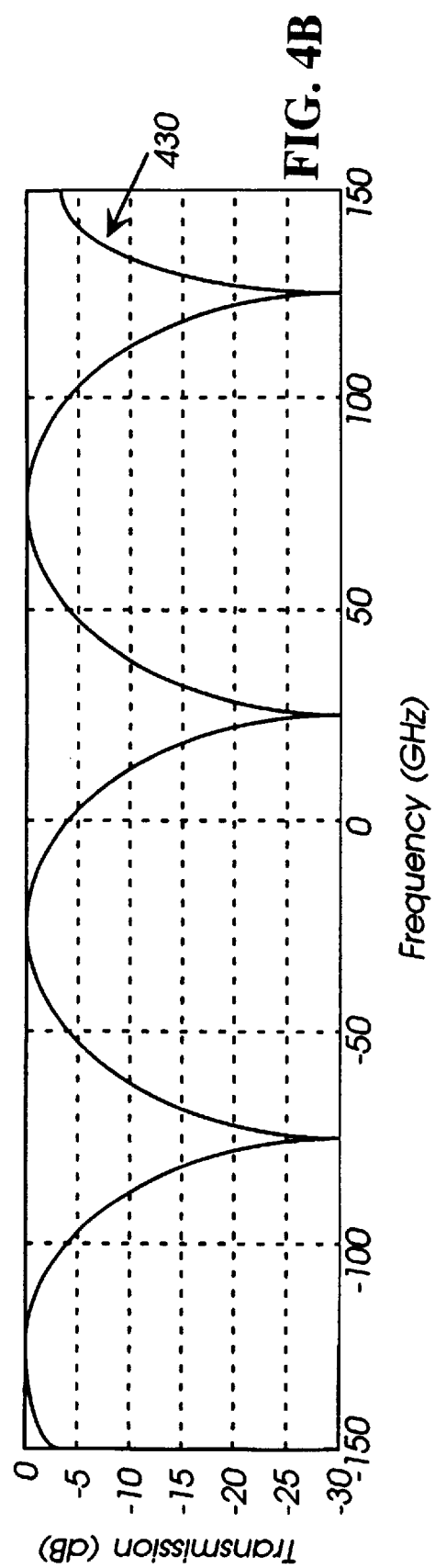

FIGS. 4a and 4b are the phase and intensity response of reflected light from an unequal path Michelson interferometer as illustrated in FIG. 3. Phase lines 410 and 420 represent the phase of the two sub-beams generated by beam splitter 320 of FIG. 3. As seen in FIG. 4a, phase line 410 corresponds to the phase of the first sub-beam that passes through etalon 360. Phase line 420 corresponds to the phase of the second sub-beam that is reflected by back surface 324. Transmission line 430 shown in FIG. 4b represents the transmission strength of the output signal of FIG. 3 for a range of frequencies.

The transfer function of the unequal path Michelson interferometer is a function of $\sin^2\Delta\phi$ of the phase difference between the two paths (or arms), $\Delta\phi=\phi_1-\phi_2$, where $\phi_1$ and $\phi_2$ are the phase of the first path and the second path, respectively. If the lengths of the first and second paths are, for example, L and 2L, respectively, then $\phi_1=2$ kL, $\phi_2=4$ kL, and $\Delta\phi=2$ kL$-2m\pi$.

Thus, $\Delta\phi$ is periodic and linear (within the $2\pi$ range) in optical frequency and the spectral transfer function is sinusoidal in optical frequency. In other words, the unequal path Michelson interferometer provides periodic transmission and attenuation characteristics. However, the unequal path Michelson interferometer does not provide enough flat-band transmission bandwidth for transmission channels or enough bandwidth for sufficient adjacent channel isolation. Therefore, the unequal path Michelson interferometer is insufficient to operate as an interleaver/deinterleaver.

Figure 5:
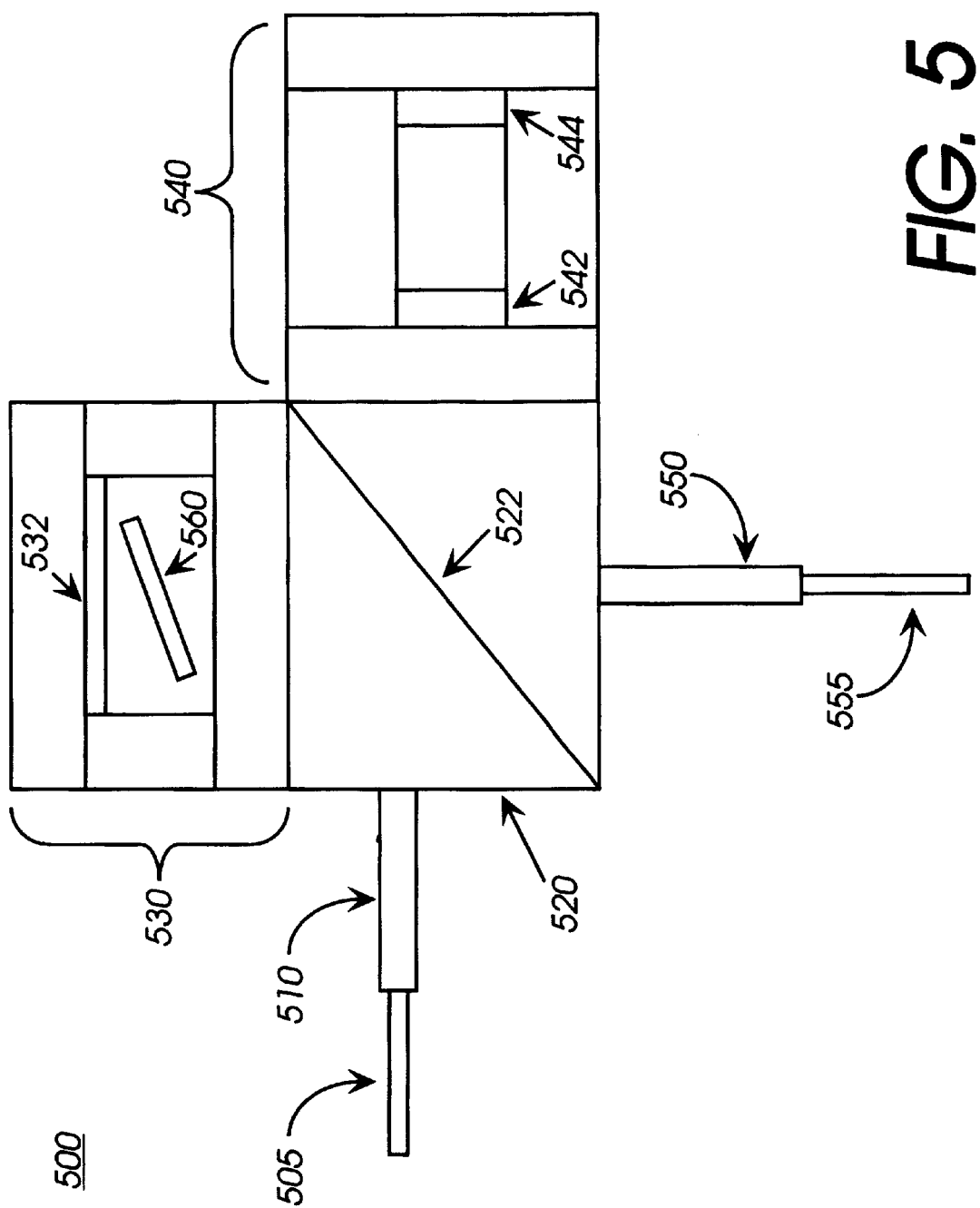
FIG. 5 illustrates one embodiment of an interleaver/deinterleaver having a 50/50 beam splitter cube.

FIG. 5 illustrates one embodiment of an interleaver/deinterleaver having a 50/50 beam splitter cube. When operating as an interleaver, interleaver/deinterleaver 500 receives a set of optical signals, for example, optical channels as defined by the International Telecommunications Union (ITU), and separates the optical signals into two subsets, for example, even channels and odd channels. When operating as a deinterleaver, interleaver/deinterleaver 500 receives two sets of signals, for example, even channels and odd channels and interleaves the sets of signals into a superset having both even and odd channels, for example, a WDM signal carrying ITU channels 15–72.

In one embodiment, the components of interleaver/deinterleaver 500 are held in optical contact by atomic force rather than epoxy; however, epoxy can also be used. In order to maintain optical contact by atomic force, the thickness of each glass plate should be consistent within a predetermined tolerance. In one embodiment the thickness tolerance for each plate is 1.0 μm; however, other tolerances can also be used.

Because of the flatness of the components of interleaver/deinterleaver 500, by abutting the components to each other, contact is maintained by atomic forces. In one embodiment, use of atomic force to maintain optical contact allows material matching to within 1.0 μm. As mentioned above, optical contact by atomic force also provides better thermal performance compared to use of epoxy to assemble optical components.

As described in greater detail below, separation of even and odd channels is useful, for example, for interfacing devices designed for one channel spacing (e.g., 200 GHz) with devices designed for a different channel spacing (e.g., 100 GHz). Thus, devices and/or networks can be upgraded without requiring that all devices be upgraded, or network bandwidth can be increased. A deinterleaver can be used to combine sets of channels (e.g., even channels and odd channels) into a single set of channels.

Beam splitter cube 520 splits the optical signal into a first sub-beam and a second sub-beam. In one embodiment, beam splitter cube 520 splits the beam evenly such that each etalon receives a 50% strength version of the input signal. In other words, beam splitter cube 520 is a 50/50 beam splitter. Other types of beam splitters can also be used. Because a precise 50/50 beam splitter is difficult to manufacture, other beam splitting ratios can also be used. In one embodiment, the two crystals of beam splitter 520 are maintained in optical contact by atomic force.

Assuming a 50/50 beam split by beam splitter cube 520, the first sub-beam is directed to etalon 530 and the second sub-beam is directed to FPPS 540. The first sub-beam is reflected by beam splitter cube interface 522 and directed to etalon 530. In one embodiment, front reflective material 534 reflects 0% to 10% of the signal directed to etalon 530 by beam splitter cube 520. In one embodiment, the gap between front reflective material 534 and back reflective material 532 is 0.75 mm; however, other gap sizes can also be used. Back reflective material 532 is reflects 90% to 100% of the signal passed by front reflective material 534. The reflected first sub-beam is passed by beam splitter cube interface 522 to collimator 550.

In one embodiment, etalon 530 is coupled to beam splitter cube 520 by optical contact. In such an embodiment, the gap between etalon 530 and beam splitter cube 520 can be less than 1.0 μm. In an alternate embodiment, etalon 530 is coupled to beam splitter cube 520 with epoxy; however, the gap between etalon 530 and beam splitter cube 520 is generally larger than when coupled by atomic force. In one embodiment, etalon 530 includes tuning plate 560. Tuning plate 560 provides interleaver/deinterleaver 500 with fine resolution (e.g., 10 nm or less). Tuning plate 560 provides fine tuning capability by changing the effective optical path length through etalon 530.

The second sub-beam is passed beam splitter cube interface 522 to FPPS 540. In one embodiment, front reflective material 542 reflects 15% to 20% of the second sub-beam directed to FPPS 540 by beam splitter cube 520. In one embodiment the gap between front reflective material 542 and back reflective material 544 is 1.5 mm; however, other gap sizes can also be used. Back reflective material 544 reflects 90% to 100% of the signal passed by front reflective material 542. The reflected second sub-beam is directed to beam splitter cube interface 522 and reflected to collimator 550. In one embodiment, FPPS 540 is coupled to beam splitter cube 520 by atomic force. In an alternate embodiment, FPPS 540 is coupled to beam splitter cube 520 with epoxy.

Etalon 530 provides a linear phase difference and a sinusoidal transfer function, as described above with respect to FIGS. 3 and 4, for the first sub-beam. FPPS 540 provides a non-linear phase response with slight attenuation, as described above with respect to FIGS. 1 and 2, for the second sub-beam. The phase and intensity response of etalon 530 and FPPS 540 cause constructive and destructive light interference at beam splitter cube interface 522. The frequencies for which constructive light interference occurs are passed at or near full intensity. The frequencies for which destructive light interference occurs results in attenuation of the optical signal.

When operating as a deinterleaver, as described above with respect to FIG. 5, interleaver/deinterleaver 500 receives a set of signals via optical fiber 505 and separates the optical signals into two subsets. Interleaver/deinterleaver 500 operates to pass a first subset of signals to optical fiber 555 and to reflect a second subset of optical signals back to optical fiber 505 to separate the optical signal into two subsets of optical signals. An optical circulator can be coupled to optical fiber 505 to carry the input and output signals to and from collimator 510.

When operating as an interleaver, interleaver/deinterleaver 500 receives a first set of optical channels (e.g., even channels) via optical fiber 555 and a second set of optical channels (e.g., odd channels) via optical fiber 505. Interleaver/deinterleaver 500 operates to pass the first set of optical channels from optical fiber 555 to optical fiber 505 and reflect the second set of optical channels from optical fiber 505 back to optical fiber 505 to combine the two sets of optical signals into a superset of optical signals. An optical circulator (not shown in FIG. 5) can be coupled to optical fiber 505 to carry the input and output signals to and from collimator 510.

Because even and odd channels have a frequency spacing that is double the frequency spacing for the combined set of channels, interleavers and deinterleavers can be used to interface devices designed for different channel spacings. For example, in a 100 GHz spaced scheme, the odd channels are spaced by 200 GHz and the even channels are spaced by 200 GHz. By separating the even and odd channels, devices that are designed to operate with 200 GHz spaced channels can interface with 100 GHz spaced devices. Other frequency ratios (e.g., 100 GHz, 50 GHz) can be similarly interfaced.

In one embodiment, interleaver/deinterleaver 500 is assembled according to the following procedure. Incoming parts are inspected to determine whether the parts satisfy a set of predetermined specifications. For example, typical glass thickness variation is approximately ±1.0 $\mu$m; however, as manufacturing procedures improve, the tolerances can be correspondingly reduced.

Beam splitter cube 520, etalon 530 and/or FPPS 540 are assembled by abutting the sub-components together such that the sub-components are held together by atomic force. Beam splitter cube 520, etalon 530 and FPPS 540 are coupled by abutment such that they are maintained in contact by atomic force.

Because the components of interleaver/deinterleaver 500 are coupled by atomic force with no epoxy between the optical elements, interleaver/deinterleaver 500 can be designed and built with sub-micron tolerances, which is necessary for sub-100 GHz FSR. Coupling of optical sub-components and elements with atomic force improves thermal performance of interleaver/deinterleaver 500.

A tuning plate holder fixture (not shown in FIG. 5) is coupled to beam splitter cube 520, etalon 530 and/or FPPS 540 to form the interleaver core. The tuning plate holder fixture can be coupled with epoxy. Tuning plate 560 is disposed within etalon 530 and connected to the tuning plate holder fixture.

The interleaver core with tuning plate 560 is attached to a package (e.g., a metallic case) in any manner known in the art. Temperature cycling can be performed if desired. The angle of tuning plate 560 is adjusted to tune interleaver/deinterleaver 500. In one embodiment, the output power and optical spectrum are monitored to tune interleaver/deinterleaver 500. Collimators 510 and 550 are soldered in place and tuning plate 560 is maintained in place by epoxy. The package is sealed and interleaver/deinterleaver 500 assembly is complete.

Figures 6A, 6B:
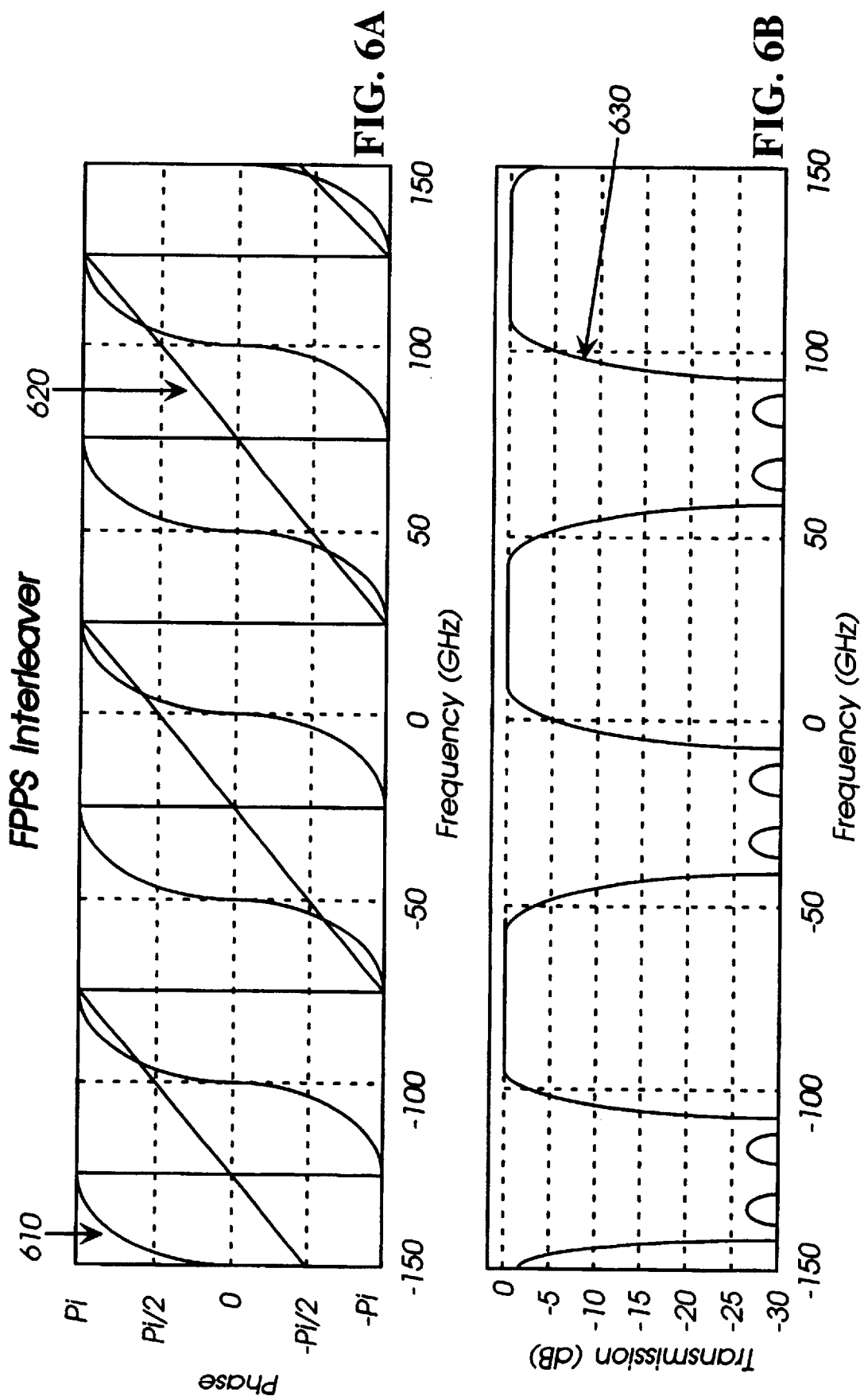
FIGS. 6a and 6b are the phase and intensity response of an interleaver/deinterleaver as illustrated in FIG. 5.

FIGS. 6*a* and 6*b* are the phase and intensity response of an interleaver/deinterleaver as illustrated in FIG. 5. By combining an FPPS and a Michelson interferometer, a periodic non-linear phase response can be achieved. As a result, periodic flat-band bandwidth can be provided. Also provided is enough bandwidth with large isolation necessary to isolate optical channels and operate as an optical interleaver/deinterleaver.

As seen in FIG. 6*a*, phase line 610 corresponds to the phase of the first sub-beam that is directed to etalon 530 as a function of frequency. Phase line 620 corresponds to the phase of the second sub-beam that is directed to FPPS 540 as a function of frequency. Transmission line 630 shown in FIG. 6*b* indicates transmission intensity of optical signals output by the interleaver as a function of frequency.

When phase lines 610 and 620 are in phase or 180° out of phase, the interleaver/deinterleaver transmits the optical signals at or near full intensity. As phase lines 610 and 620 become out of phase with respect to each other the intensity of the optical signals decreases and the signal is attenuated. Because phase line is periodic and non-linear, transmission line 630 indicates regularly spaced frequencies corresponding to relatively wide, flat pass bands.

Transmission of the optical signals at or near full intensity occurs when the two sub-beams are in phase or are 180° out of phase because of constructive light interference at beam splitter cube interface 522. When the two sub-beams are out of phase, destructive interference at beam splitter cube interface 522 causes the two sub-beams to cancel each other, which results in attenuation of the original optical signal.

Figure 7:
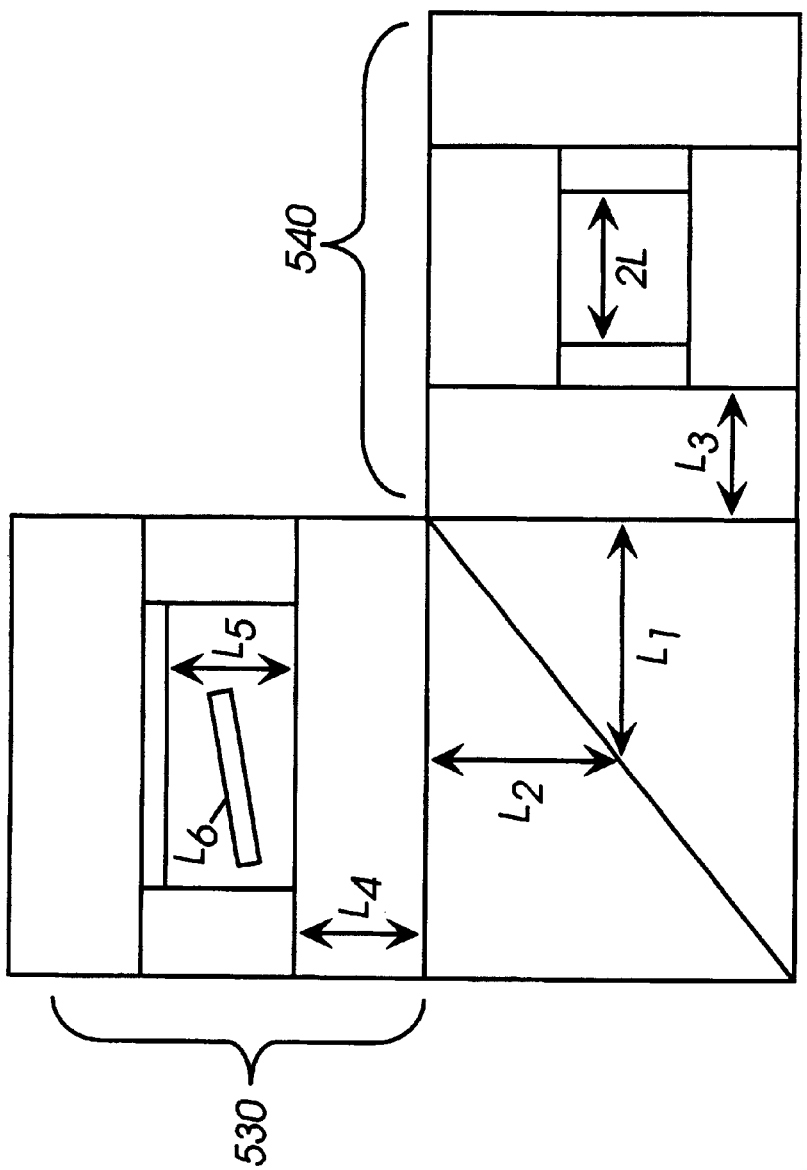
FIG. 7 illustrates certain dimensions for one embodiment of a Michelson phase shifter interleaver/deinterleaver.

FIG. 7 illustrates certain dimensions for one embodiment of a Michelson phase shifter interleaver/deinterleaver. The dimensions described are used to tune the interleaver/deinterleaver to separate even and odd ITU channels from a WDM input signal and to combine even and odd ITU channels to output a WDM signal. Other dimensions can be used for other filtering characteristics.

2L is the length of the air gap of FPPS 540;
$L_1$ is the distance between the midpoint of the beam splitter cube interface and the surface to which FPPS 540 is coupled;
$L_2$ is the distance between the midpoint of the beam splitter cube interface and the surface to which etalon 530 is coupled;
$L_3$ is the thickness of the front plate of FPPS 540;
$L_4$ is the thickness of the front plate of etalon 530;
$L_5$ is the length of the air gap of etalon 530; and
$L_6$ is the thickness of the tuning plate.

In one embodiment, the length air gap of FPPS 540, 2L, is determined according to:

$$2L = c/2/FSR$$

where c is the speed of light and FSR is the free spectral range, or the frequency difference between channels to be filtered. For 50 GHz channel spacing 2L=2.9971 and for 100 GHz channel spacing 2L=1.4986.

In one embodiment the following phase matching conditions are used:

$$L=L_5+L_6 f(\phi)+n(L_4-L_3)+n(L_2-L_1)$$

where $$f(\phi) = \frac{n}{\cos\phi} - \frac{\cos(\phi - \phi')}{\cos\phi'},\ f(0) = (n-1),\ \phi' = \sin^{-1}\left(\frac{\sin\phi}{n}\right),$$

and n is the index of reflection for the material through which the optical signal passes, and the following design parameters are used:

$L_1 \approx L_2 \pm 10$ μm for a beam splitter embodiment,
$L_6=L_4=1.5$ mm, which are chosen values,
$L_3=L_4+L_6=3$ mm,
$L_6-L_5 \approx L=1.4985$ for 100 GHz spacing, and
$L_6-L_5 \approx L=0.74925$ for 50 GHz spacing.

Figure 8A:
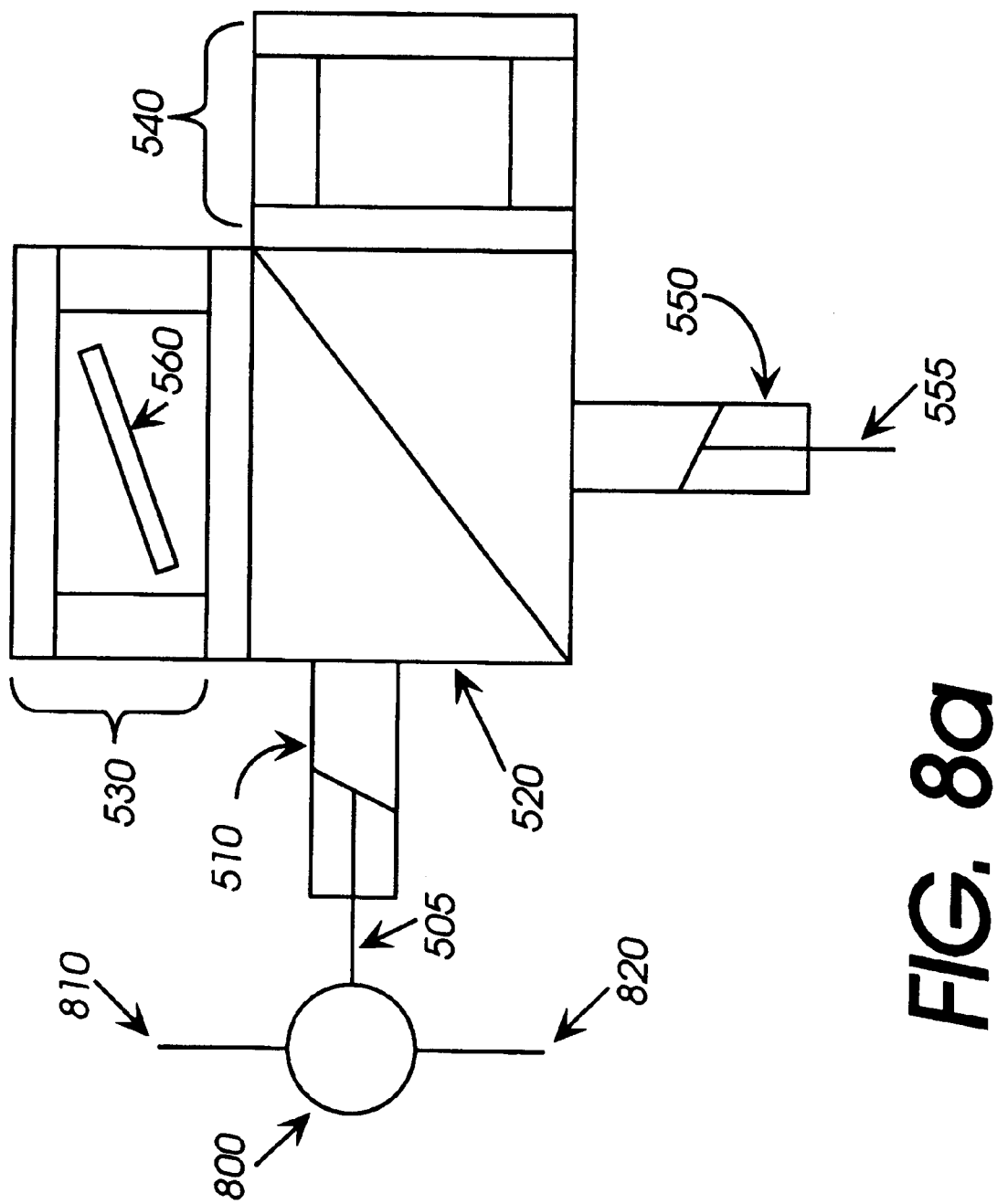
FIG. 8a illustrates one embodiment of a Michelson phase shifter interleaver/deinterleaver having two input/output ports arranged with near normal incidence with respect to the beam splitter cube.

FIG. 8a illustrates one embodiment of a Michelson phase shifter interleaver/deinterleaver having two input/output ports arranged with near normal incidence with respect to the beam splitter cube. In one embodiment, both collimators (510 and 550) are arranged with near normal incidence (i.e., nearly perpendicular) with respect to the surface beam splitter cube 520.

When operating as a deinterleaver, a WDM or DWDM optical signal having odd and even ITU channels is carried by optical fiber 810 to circulator 800. Circulator 800 directs the optical signal to optical fiber 505, which carries the optical signal to collimator 510. Interleaver/deinterleaver 500 operates as described above to separate the set of optical signals into subsets of even and odd channels.

One subset of optical channels (e.g., even channels) is output via collimator 550 to optical fiber 555. The second subset of optical channels (e.g., odd channels) is output via collimator 510 to optical fiber 505. The second subset of optical channels is carried by optical fiber 505 to circulator 800, which directs the second subset of optical channels to optical fiber 820.

When operating as an interleaver, interleaver/deinterleaver 500 receives a set of optical channels (e.g., even channels) from optical fiber 555 via collimator 550. A second set of optical channels (e.g., odd channels) is carried by optical fiber 820 and directed to optical fiber 505 by circulator 800. Interleaver/deinterleaver 500 receives the second set of optical signals from fiber 505 via collimator 510. Interleaver/deinterleaver 500 combines the sets of optical signals into a superset of optical signals having both even and odd channels as described above.

The superset of optical signals is output to collimator 505 via 510. Circulator 800 directs the superset of optical signals to optical fiber 810. Thus, when collimators 510 and 550 are arranged with normal incidence with respect to beam splitter cube 520, a circulator (e.g., circulator 800) is used to direct input and output signals through collimator 510.

Figure 8B:
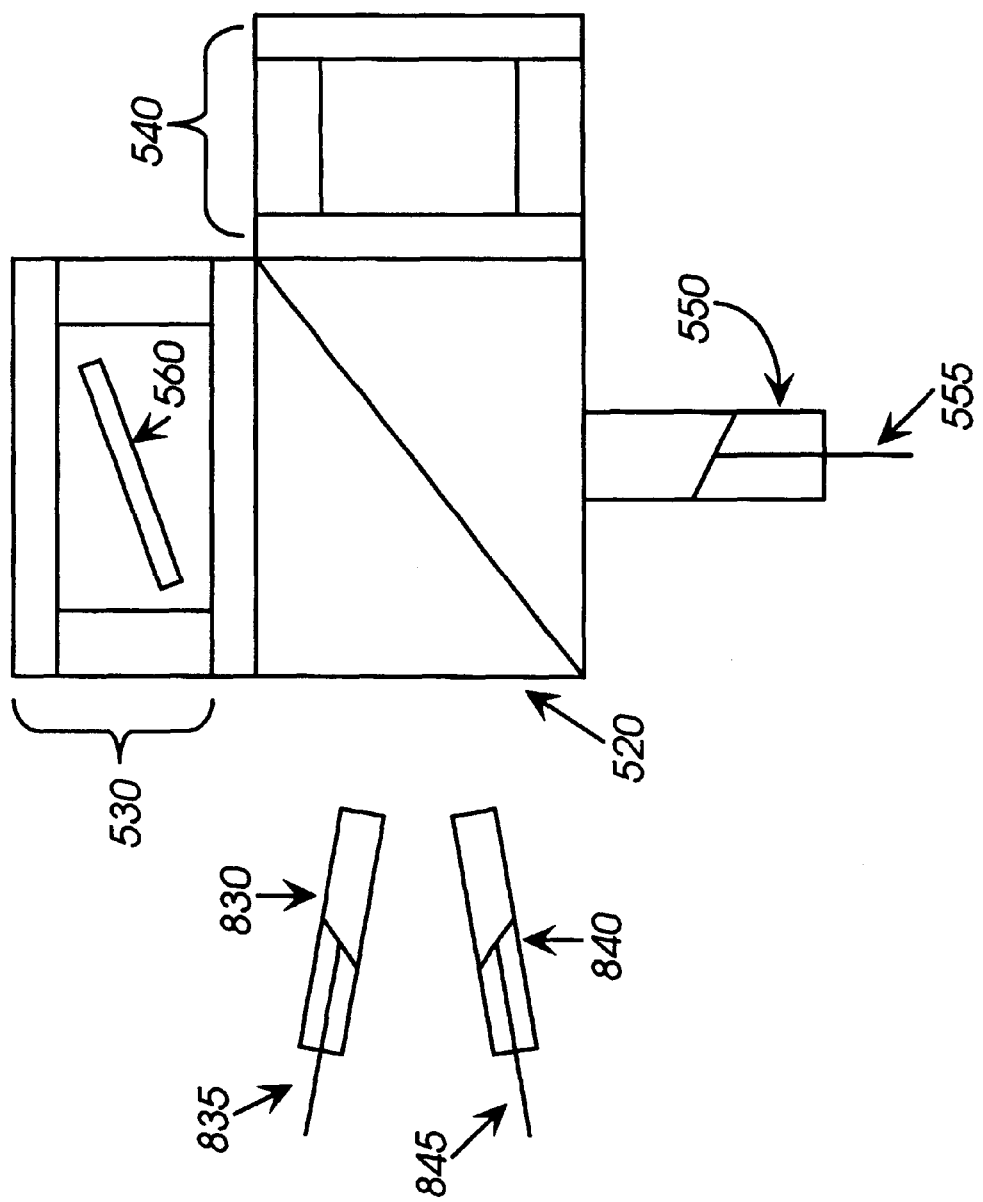
FIG. 8b illustrates one embodiment of a Michelson phase shifter interleaver/deinterleaver having two input/output ports arranged with angled incidence with respect to the beam splitter cube.

FIG. 8b illustrates one embodiment of a Michelson phase shifter interleaver/deinterleaver having two input/output ports arranged with angled incidence with respect to the beam splitter cube. In one embodiment, collimators 830 and 840 are arranged with an angled incidence with respect to the surface of beam splitter cube 520 while collimator 850 is arranged with normal incidence with respect to the surface of beam splitter cube 520. In one embodiment, collimators 830 and 840 are arranged with 3±0.12° incidence (i.e., approximately 3° away from perpendicular) and 6±024° angle between collimators 830 and 840 (i.e., approximately 6° away from parallel).

Collimator 550 and optical fiber 555 are arranged and operate in the same manner as with FIG. 8a. When operating as a deinterleaver, the input optical signal is received from optical fiber 835 via collimator 830. The channels of the optical signal are separated as described above; however, because of the angle of incidence of the input signal, the output signal to optical fiber 845 though collimator 840 has the same angle of incidence. Because the input and output optical signals are separated, a circulator is not necessary. In one embodiment, collimators 830 and 840 are replaced by a dual-fiber collimator to receive optical fibers 835 and 845.

When operating as an interleaver, even and odd channels are received by collimators 840 and 550 from optical fibers 845 and 555, respectively. The even and odd channels are combined as described above and output to optical fiber 835 via collimator 830.

Figure 8C:
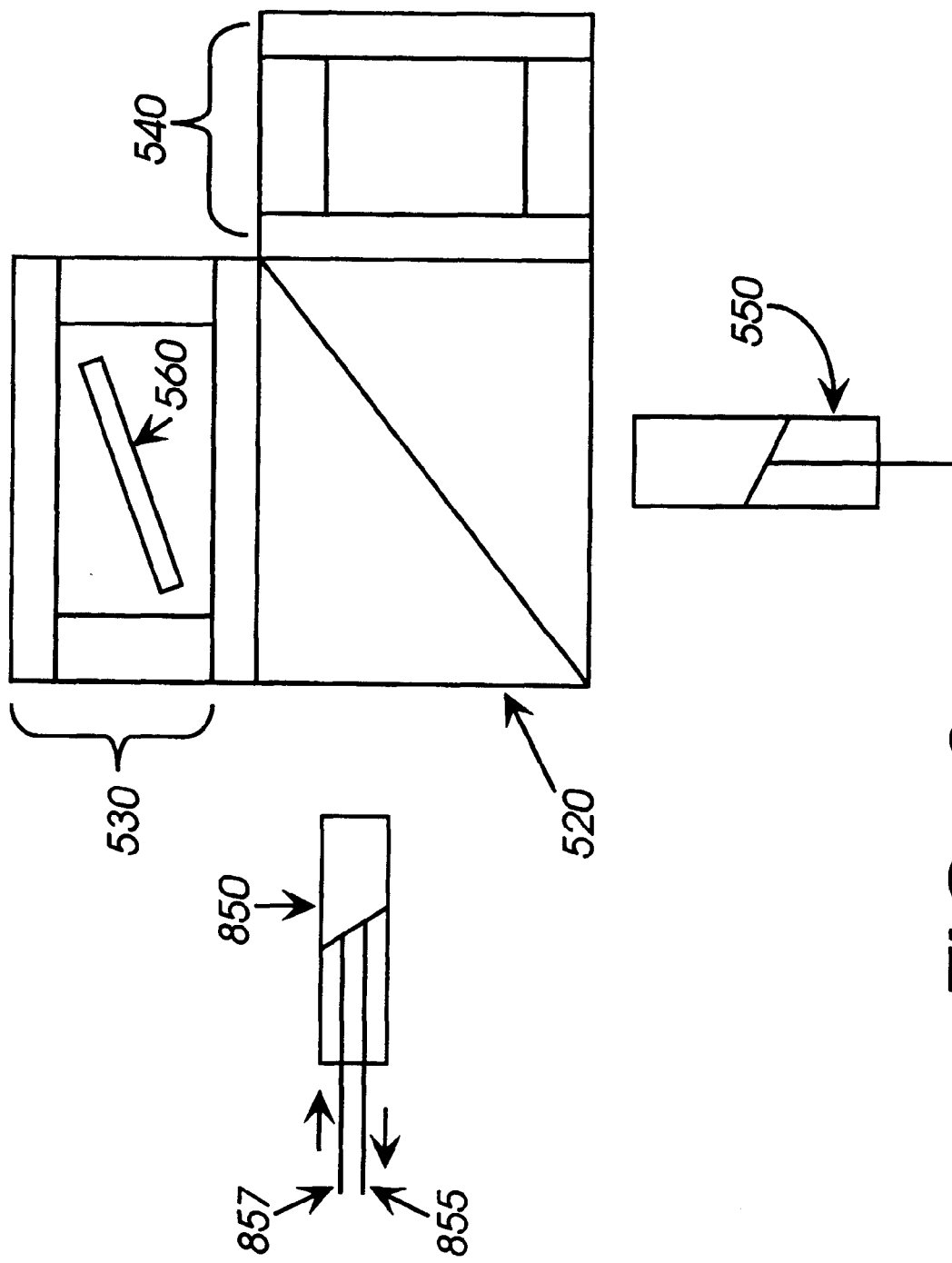
FIG. 8c illustrates one embodiment of a Michelson phase shifter interleaver/deinterleaver having a two-fiber input/output port and a single-fiber input/output port, both of which are arranged with near normal incidence with respect to the beam splitter cube.

FIG. 8c illustrates one embodiment of a Michelson phase shifter interleaver/deinterleaver having a two-fiber input/output port and a single-fiber input/output port, both of which are arranged with near normal incidence with respect to the beam splitter cube. In one embodiment, dual-fiber collimator 850 and single-fiber collimator 550 are arranged with an normal incidence with respect to the surface of beam splitter cube 520. Dual-fiber collimator 850 includes a walk-off element such as, for example, a walk-off crystal to direct optical signals to and from the appropriate fiber.

Collimator 550 and optical fiber 555 are arranged and operate in the same manner as with FIGS. 8a and 8b. When operating as a deinterleaver, the input optical signal is received from optical fiber 857 via collimator 850. The channels of the optical signal are separated as described above and the output signals are directed to optical fiber 855 via collimator 850 and to optical fiber 555 through collimator 550. Because the input and output optical signals are separated, a circulator is not necessary.

When operating as an interleaver, even and odd channels are received by collimators 850 and 550 from optical fibers 855 and 555, respectively. The even and odd channels are combined as described above and output to optical fiber 857 via collimator 850.

Figure 9A:
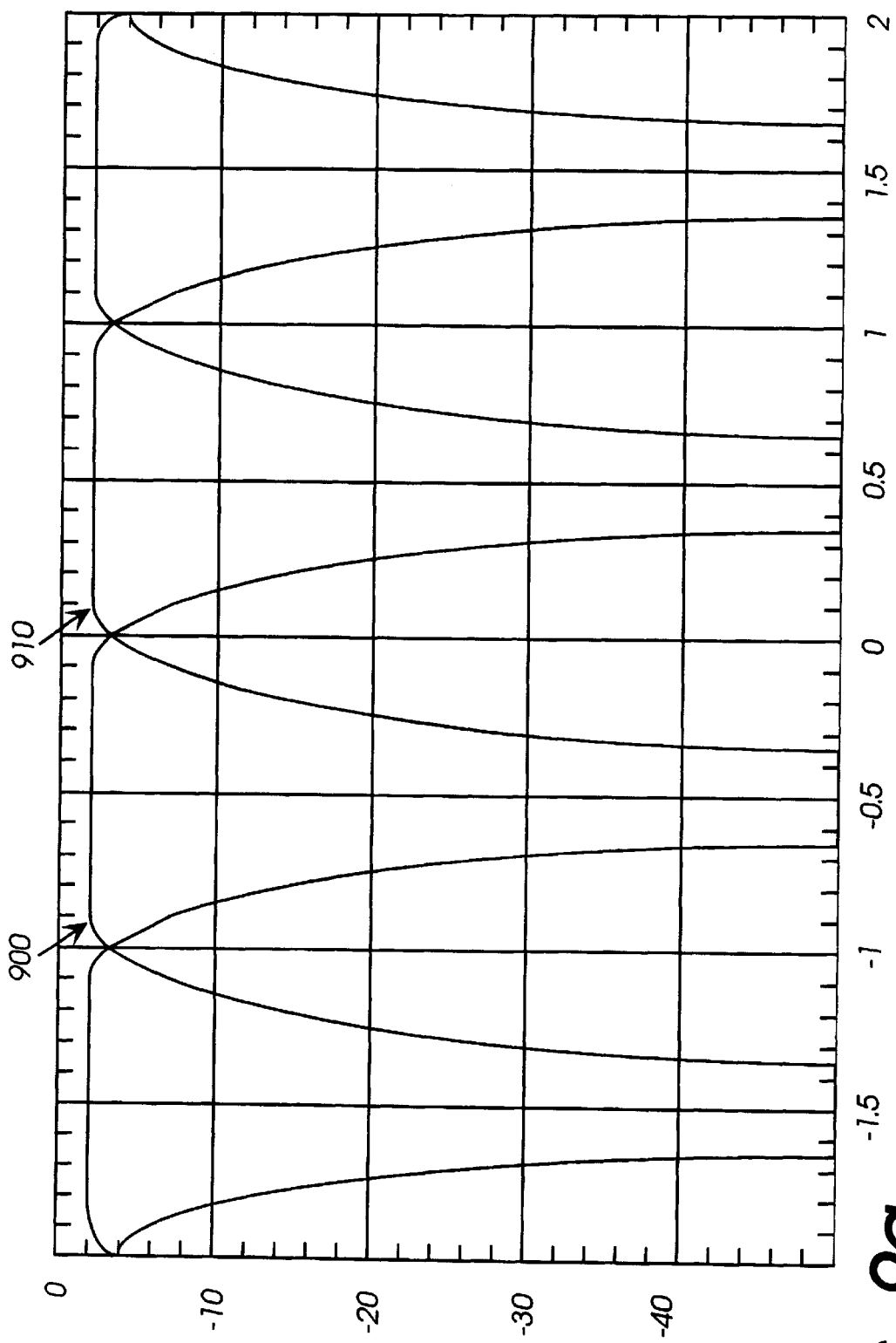
FIG. 9a is a transmission plot for a Michelson phase shifter interleaver/deinterleaver operating as a deinterleaver with an input/output port having near normal incidence and where the FPPS has a reflectivity of 12%.

FIG. 9a is a transmission plot for a Michelson phase shifter interleaver/deinterleaver operating as a deinterleaver with an input/output port having near normal incidence and where the FPPS has a reflectivity of 12%. Transmission line 900 corresponds to a first port to pass a first subset of optical signals (e.g., even channels) and transmission line 910 corresponds to a second port to pass a second subset of optical signals (e.g., odd channels).

Figure 9B:
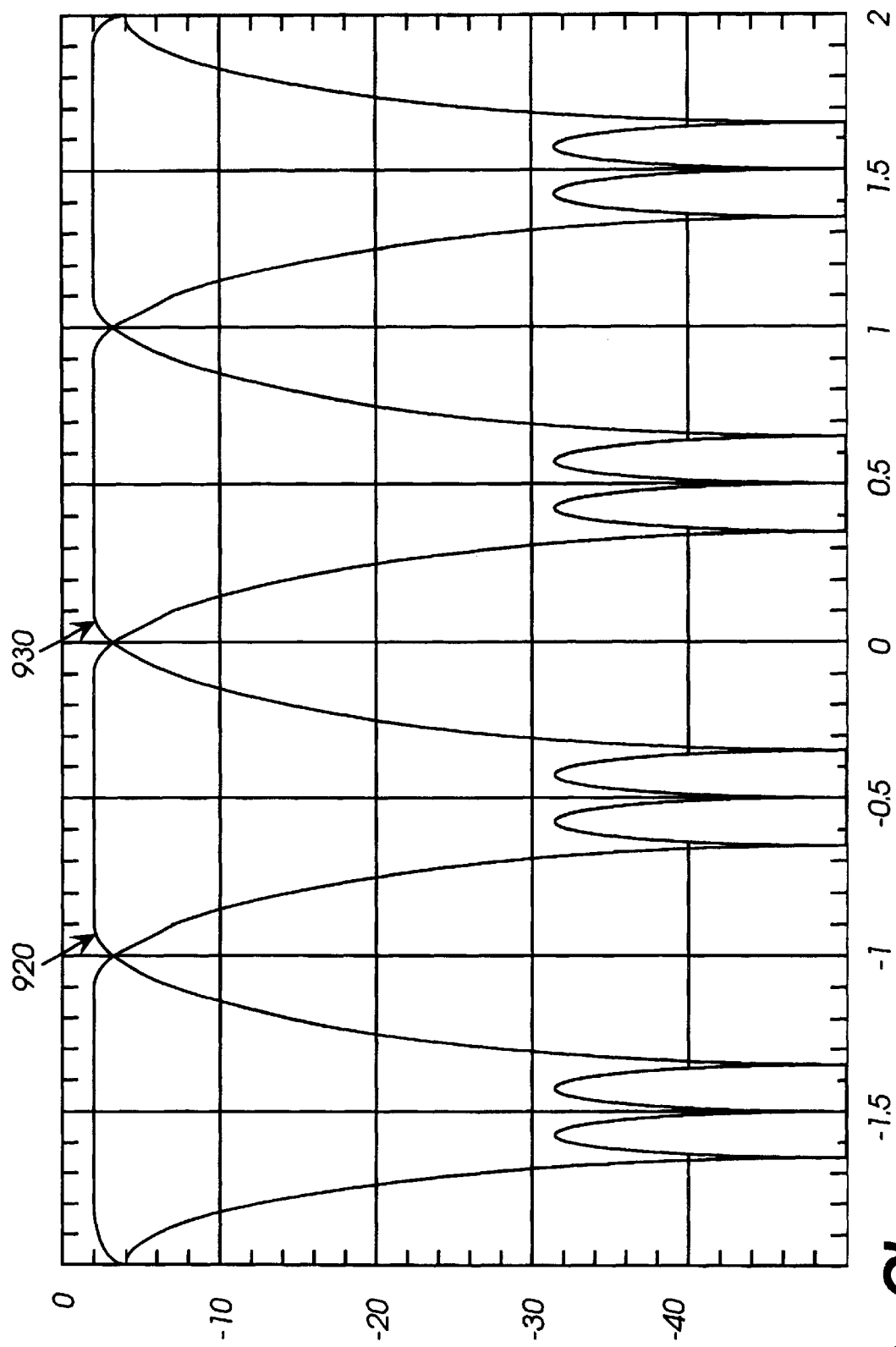
FIG. 9b is a transmission plot for a Michelson phase shifter interleaver/deinterleaver operating as a deinterleaver with an input/output port having near normal incidence and where the FPPS has a reflectivity of 16%.

FIG. 9b is a transmission plot for a Michelson phase shifter interleaver/deinterleaver operating as a deinterleaver with an input/output port having near normal incidence and where the FPPS has a reflectivity of 16%. Transmission line 920 corresponds to a first port to pass a first subset of optical signals (e.g., even channels) and transmission line 930 corresponds to a second port to pass a second subset of optical signals (e.g., odd channels).

Figure 9C:
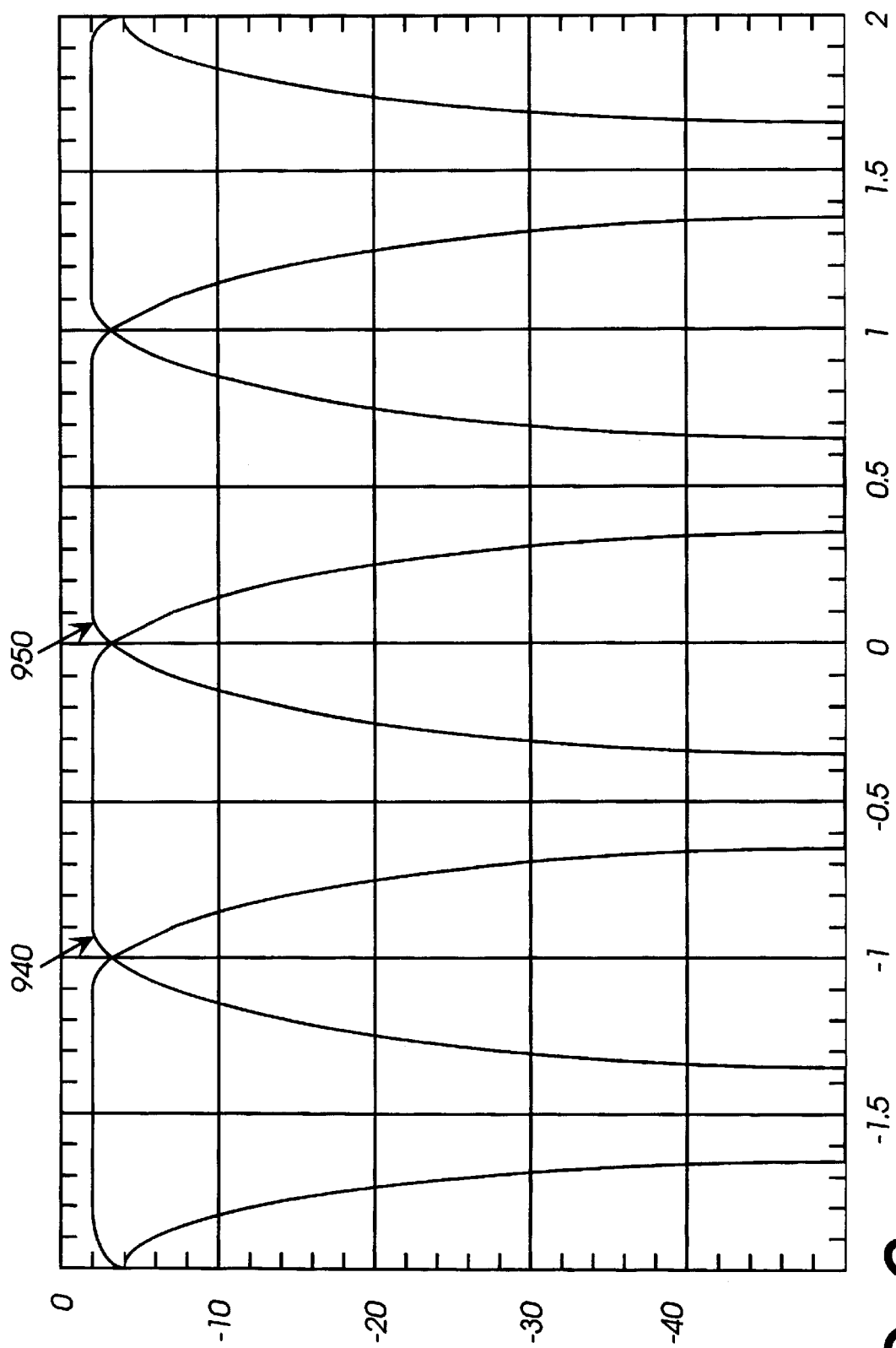
FIG. 9c is a transmission plot for a Michelson phase shifter interleaver/deinterleaver operating as a deinterleaver with input and output ports having 3° incidence and where the FPPS has a reflectivity of 16%.

FIG. 9c is a transmission plot for a Michelson phase shifter interleaver/deinterleaver operating as a deinterleaver with input and output ports having 3° incidence and where the FPPS has a reflectivity of 16%. Transmission line 940 corresponds to a first port to pass a first subset of optical signals (e.g., even channels) and transmission line 950 corresponds to a second port to pass a second subset of optical signals (e.g., odd channels).

Figure 9D:
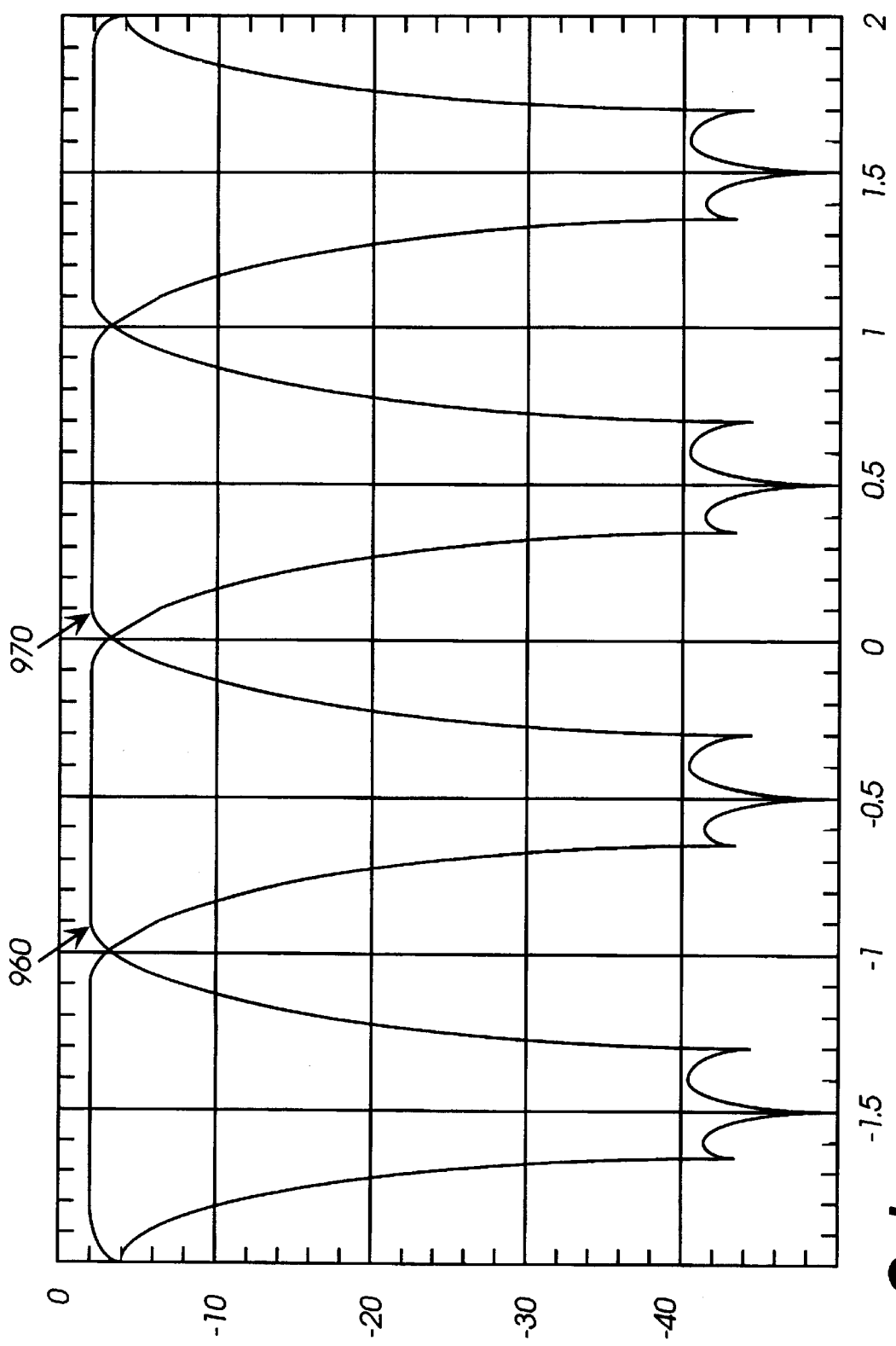
FIG. 9d is a transmission plot for a Michelson phase shifter interleaver/deinterleaver operating as a deinterleaver with input and output ports having 3° incidence and where the FPPS has a reflectivity of 20%.

FIG. 9d is a transmission plot for a Michelson phase shifter interleaver/deinterleaver operating as a deinterleaver with input and output ports having 3° incidence and where the FPPS has a reflectivity of 20%. Transmission line 960 corresponds to a first port to pass a first subset of optical signals (e.g., even channels) and transmission line 970 corresponds to a second port to pass a second subset of optical signals (e.g., odd channels).

Figure 10:
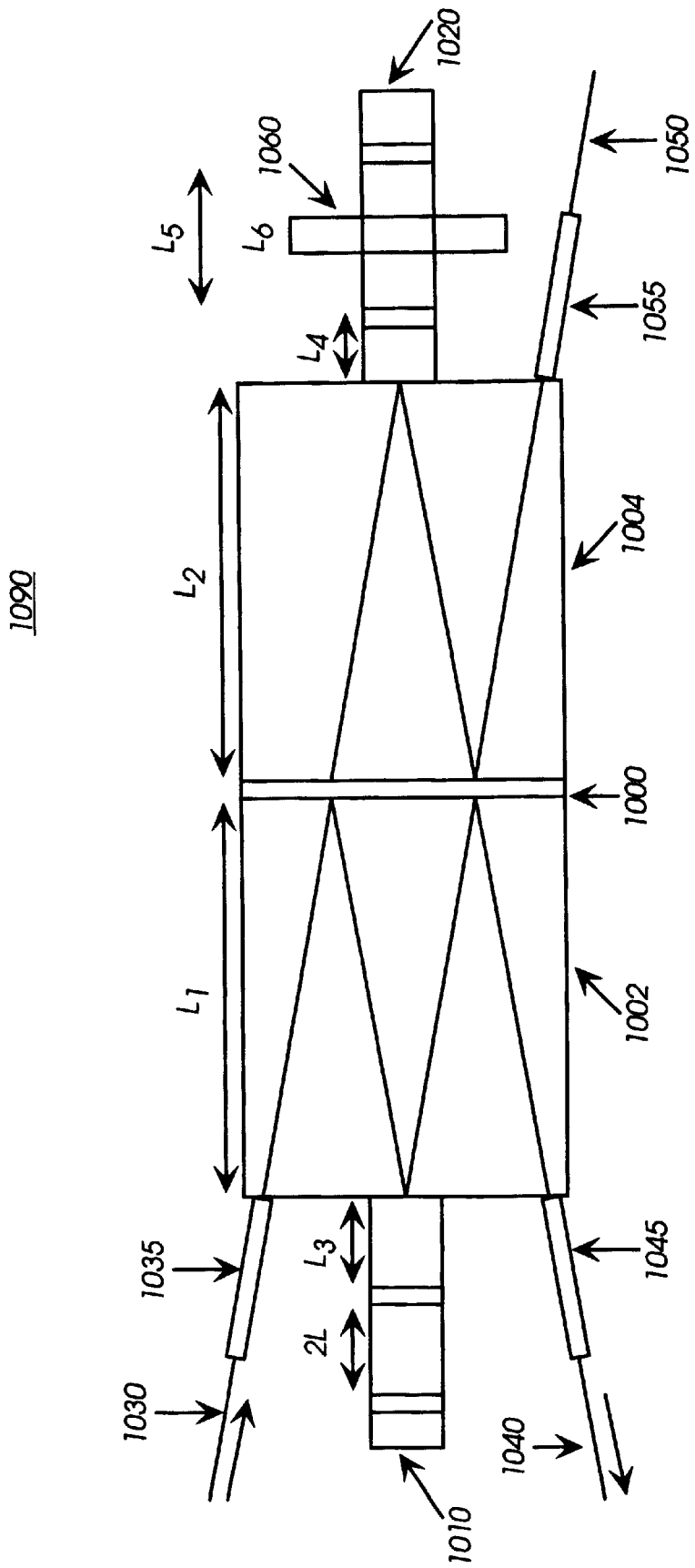
FIG. 10 illustrates certain dimensions for one embodiment of a Michelson phase shifter interleaver/deinterleaver with a contact plate splitter.

FIG. 10 illustrates certain dimensions for one embodiment of a Michelson phase shifter interleaver/deinterleaver with a contact plate splitter. In one embodiment, the air gap dimensions, the phase matching parameters and the design parameters are the same for the interleaver with the contact plate as with the interleaver with the beam splitter with the following exception:

$$L_1 \approx L_2 \pm 0.5 \mu m$$

for a plate splitter embodiment.

The arrows of FIG. 10 indicate signal paths when interleaver/deinterleaver 1090 operates as a deinterleaver. Input and output paths are reversed when interleaver/deinterleaver 1090 operates as an interleaver. In general, interleaver/deinterleaver 1090 operates in a similar manner as the beam splitter cube interleaver/deinterleavers described above. In one embodiment, plate splitter 1000 is a 50/50 beam splitter; however, other plate splitters can be used. In one embodiment crystals 1002 and 1004 are silica; however, other materials can also be used.

In one embodiment, FPPS 1010 and etalon 1020 are coupled to contact plate splitter 1006 by atomic force. Coupling with atomic force allows the gaps between FPPS 1010 and contact plate splitter 1006 and between etalon 1020 and contact plate splitter 1006 to be less than 1.0 $\mu$m. In an alternate embodiment, FPPS 1010 and etalon 1020 are coupled to contact plate splitter 1006 by epoxy. As mentioned above, coupling with atomic force improves both thermal and optical performance.

When operating as a deinterleaver, an interleaved optical signal is received from optical signal 1030 through collimator 1035. In one embodiment the optical signal has a 3±0.12° incidence angle; however, other angles can also be used. The incident angle can be varied (e.g., by ±0.12°) to fine tune the filtering characteristics of interleaver/deinterleaver 1090. In one embodiment, ±0.12° incident angle adjustment corresponds to a ±20 GHz FSR adjustment.

The optical signal passes through crystal 1002 to plate splitter 1000. In one embodiment, plate splitter passes 50% of the intensity of the optical signal and reflects the other 50% of the intensity of the optical signal. Thus, plate splitter 1000 is a 50/50 plate splitter; however, other plate splitters can also be used.

The reflected optical signal passes through crystal 1002 to FPPS 1010. A phase shifted version of the optical signal is reflected back to plate splitter 1000. The optical passes through crystal 1004 to etalon 1020. A version of the optical signal having a linear phase difference is reflected back to plate splitter 1000.

At plate splitter 1000, the reflected signals converge and, through constructive and destructive interference, are separated into even and odd channels. One set of channels (e.g., even channels) is directed to optical fiber 1050 via collimator 1055. The second set of signals (e.g., odd channels) is directed to optical fiber 1040 via collimator 1040.

In one embodiment, tuning plate 1060 is used to fine tune the phase characteristics of interleaver/deinterleaver 1090. Tuning plate 1060 operates in a similar manner as tuning plate 560 described above. In one embodiment, a ±0.01° adjustment to tuning plate 1060 corresponds to a ±10 nm phase distance.

The collimators (1035, 1045 and 1055) are oriented at a predetermined angle away from normal with respect to the surfaces of the crystals of interleaver/deinterleaver 1090. In one embodiment, the angle is ±0.12°; however, other angles can be used, for example, with different crystal dimensions.

When operating as an interleaver, even and odd channels are received by collimators 1045 and 1055 from optical fibers 1040 and 1050, respectively. The even and odd channels are combined as described above and output to optical fiber 1030 via collimator 1035.

In one embodiment, interleaver/deinterleaver 1090 is assembled according to the following procedure; however, similar interleaver/deinterleaver devices can be assembled according to slightly different procedures. Incoming parts are inspected to determine whether the parts satisfy a set of predetermined specifications. For example, current crystal thickness variation is approximately ±1.0 $\mu$m; however, as tolerances improve, the specifications can be correspondingly reduced.

Contact plate splitter 1006, etalon 1020 and/or FPPS 1010 are assembled by abutting the sub-components together such that the sub-components are held together by atomic force. Contact plate splitter 1006, etalon 1020 and/or FPPS 1010 are coupled by abutment such that they are maintained in contact by atomic force.

Because the components of interleaver/deinterleaver 1090 are coupled by atomic force with no epoxy between the optical elements, interleaver/deinterleaver 1090 can be designed and built with sub-micron tolerances, which is necessary for sub-100 GHz FSR. Coupling of optical sub-components and elements with atomic force improves thermal performance of interleaver/deinterleaver 1090.

A tuning plate holder fixture (not shown in FIG. 10) is coupled to contact plate splitter 1006, etalon 1020 and FPPS 1010 to form the interleaver core. The tuning plate holder fixture can be coupled with epoxy or by atomic force. Tuning plate 1060 is disposed within etalon 1020 and connected to the tuning plate holder fixture.

The interleaver core with tuning plate 1060 is attached to a package (e.g., a metallic case) in any manner known in the art. Temperature cycling can be performed if desired. The incidence angle for collimators 1035, 1045 and 1055 and the angle of tuning plate 1060 are adjusted to tune interleaver/deinterleaver 1090. In one embodiment, the output power and optical spectrum are monitored to tune interleaver/deinterleaver 1090. Collimators 1035, 1045 and 1055 are soldered in place and tuning plate 1060 is maintained in place by epoxy. The package is sealed and interleaver/deinterleaver 1090 assembly is complete.

Figure 11A:
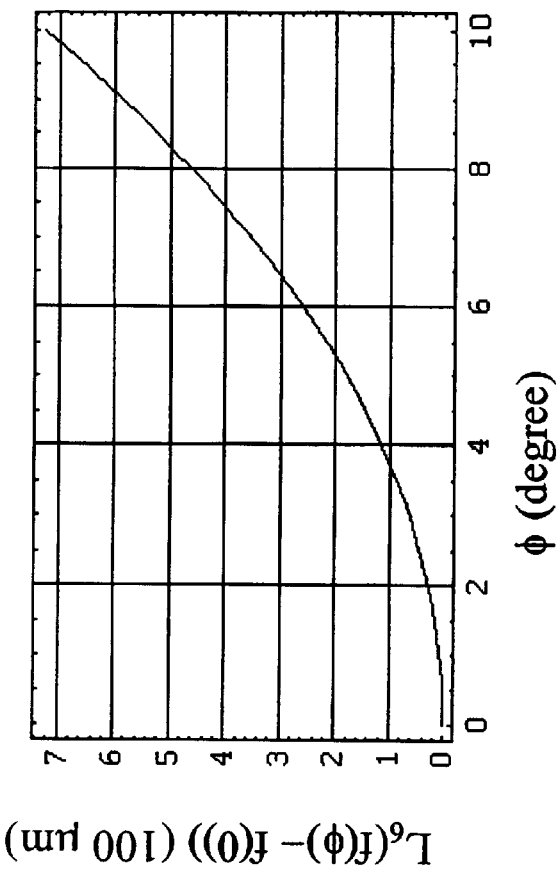
FIG. 11a is a plot of change in optical path length versus tuning plate angle, $\phi$, for one embodiment of an interleaver/deinterleaver having a tuning plate.

FIG. 11a is a plot of change in optical path length versus tuning plate angle, $\phi$, for one embodiment of an interleaver/deinterleaver having a tuning plate. The plot of FIG. 11a illustrates course tuning of an interleaver/deinterleaver having an etalon with a tuning plate. The plot of FIG. 11a is for a tuning plate having a thickness of 1500 $\mu$m.

In one embodiment, the function of change in optical path length is:

$$L_6(f(\phi) - f(0))$$

where $f(\phi)$ and $f(0)$ are the functions described above. Thus, as the tuning plate is rotated, the optical path length changes in a non-linear fashion.

For example, when the tuning plate is rotated to an angle of 5° away from parallel with the front and back plates of the etalon, the optical path length of the etalon is increased by approximately 1500 $\mu$m. As another example, if the tuning plate is rotated to an angle of 8° away from parallel with the front and back plates of the etalon, the optical path length is increased by 4600 µm.

Figure 11B:
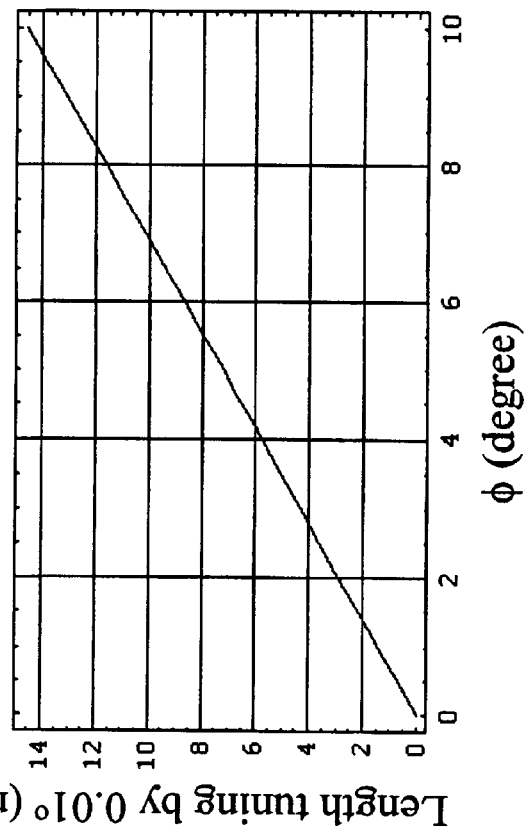
FIG. 11b is a plot of differential change in optical path length by when $\Delta\phi=0.01°$ versus tuning plate angle, $\phi$, for one embodiment of an interleaver/deinterleaver having a tuning plate.

FIG. 11b is a plot of differential change in optical path length by when Δφ=0.01° versus tuning plate angle, φ, for one embodiment of an interleaver/deinterleaver having a tuning plate. The plot of FIG. 11b illustrates fine tuning of an interleaver/deinterleaver having an etalon with a tuning plate. The plot of FIG. 11b is for a tuning plate having a thickness of 1500 µm.

The plot of FIG. 11b illustrates the change in optical path length for each 0.01° change in the position of the tuning plate for starting angles in the range of 0° to 10°. For example, if the tuning plate is at an angle of 5° away from parallel with respect to the front and back plates of the etalon, an increase of the tuning plate angle by 0.01° results in a 7 nm increase in the optical path. In other words, at an angle of 5°, the tuning plate provides 7 nm resolution. As another example, if the tuning plate is at an angle of 2° with respect to the front and back plates of the etalon, an increase of the tuning plate angle of 0.01° results in a 5 nm increase in the optical path length, or a resolution of 5 nm at 2°.

Figure 12:
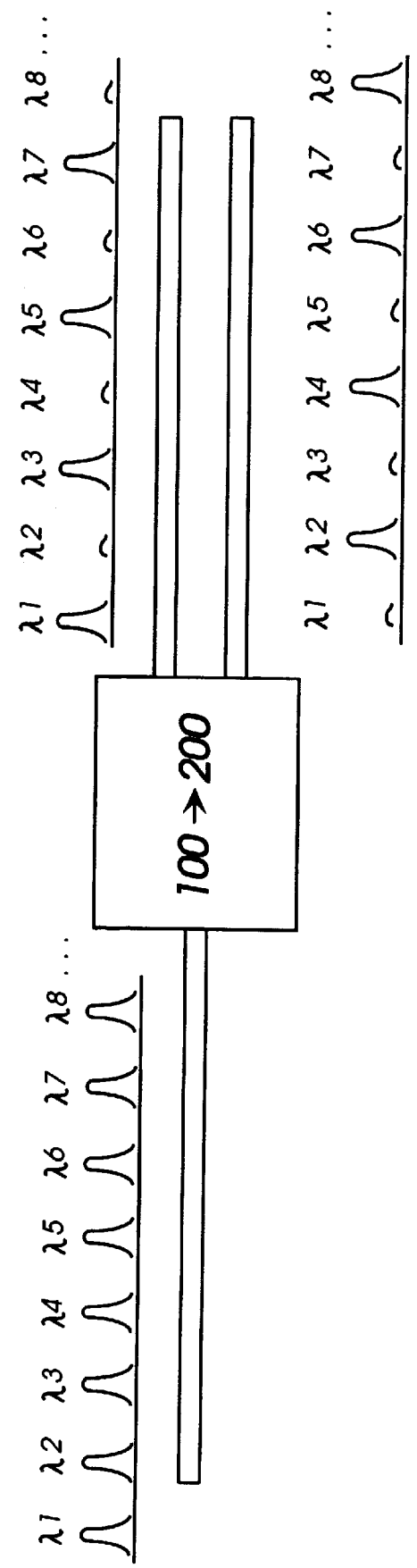
FIG. 12 is a conceptual illustration of a conversion from an optical channel scheme having 100 GHz spacing to an optical channel scheme having 200 GHz.

FIG. 12 is a conceptual illustration of a conversion from an optical channel scheme having 100 GHz spacing to an optical channel scheme having 200 GHz. The conversion of FIG. 12 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 12 is a deinterleaver that separates an optical signal having even and odd channels (e.g., ITU channels) into a first optical signal including the even channels and a second optical signal including the odd signals. After the signals are deinterleaved, the odd channels have a 200 GHz spacing and the even channels have a 200 GHz spacing. Recombining the even and the odd channels can be accomplished with an interleaver that combines the odd channels and the even channels into a single optical signal. In other words, the even and odd channels having 200 GHz spacing are combined (interleaved) into an optical signal having 100 GHz signal spacing. Similar interleaving can be provided to convert between 50 GHz spaced channels and 100 GHz spaced channels, as well as between other sets of channel spacing schemes.

Figure 13:
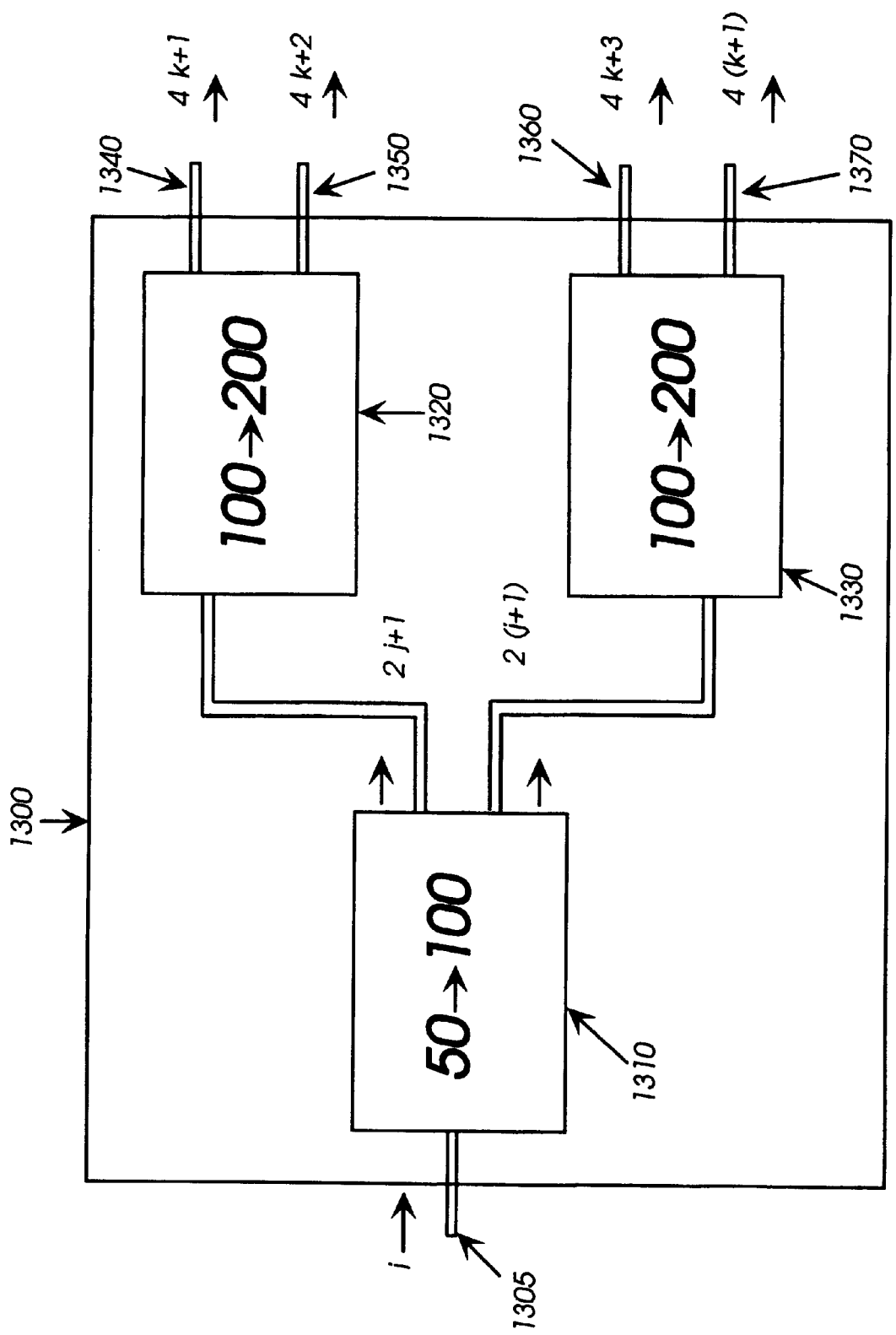
FIG. 13 is a block diagram of an optical deinterleaver for conversion from an optical channel scheme having 50 GHz spacing to an optical channel scheme having 200 GHz spacing.

FIG. 13 is a block diagram of an optical deinteleaver for conversion from an optical channel scheme having 50 GHz spacing to an optical channel scheme having 1300 GHz spacing. In general, deinterleaver 1300 includes deinterleaver 1310 to convert from one set of 50 GHz spaced channels to two sets of 100 GHz spaced channels. Deinterleaver 1300 also includes two deinterleavers (1320 and 1330) each of which convert one of the sets of 100 GHz spaced channels to two sets of 200 GHz spaced channels. Deinterleaver 1300 allows devices designed for 200 GHz spaced channels to interact with devices or networks designed for 50 GHz spaced channels.

Optical fiber 1305 carries a set of optical channels, i, having 50 GHz spacing. Deinterleaver 1310 separates the set of optical channels into sets of even, 2(j+1), and odd, 2j+1, channels. The even channels are input to deinterleaver 1330 and the odd channels are input deinterleaver 1320. The even and the odd channels have 100 GHz spacing.

Deinterleavers 1320 and 1330 operate to further separate the set of optical channels. Conceptually, deinterleaver 1320 and 1330 operate on the respective 100 GHz spaced channels to separate the input channels into "even" and "odd"0 channels. The sets of channels output by deinterleavers 1320 and 1330 have 200 GHz spacing.

Deinterleaver 1320 separates the odd channels into two sets of channels, odd-odd channels, 4k+1, output by optical fiber 1340 and odd-even, 4k+2, channels output by optical fiber 1350. Deinterleaver 1330 separates the even channels into two sets of channels, the even-odd, 4k+3, channels output by optical fiber 1360 and the even-even, 4(k+1), channels output by optical fiber 1370.

The four sets of channels output by deinterleaver 1300 are 200 GHz spaced channels. Thus, deinterleaver 1300 can be used to interface one or more devices designed to operate on 200 GHz spaced channels with one or more devices or networks designed to operate on 50 GHz spaced channels. Other channel spacings can also be supported.

Figure 14:
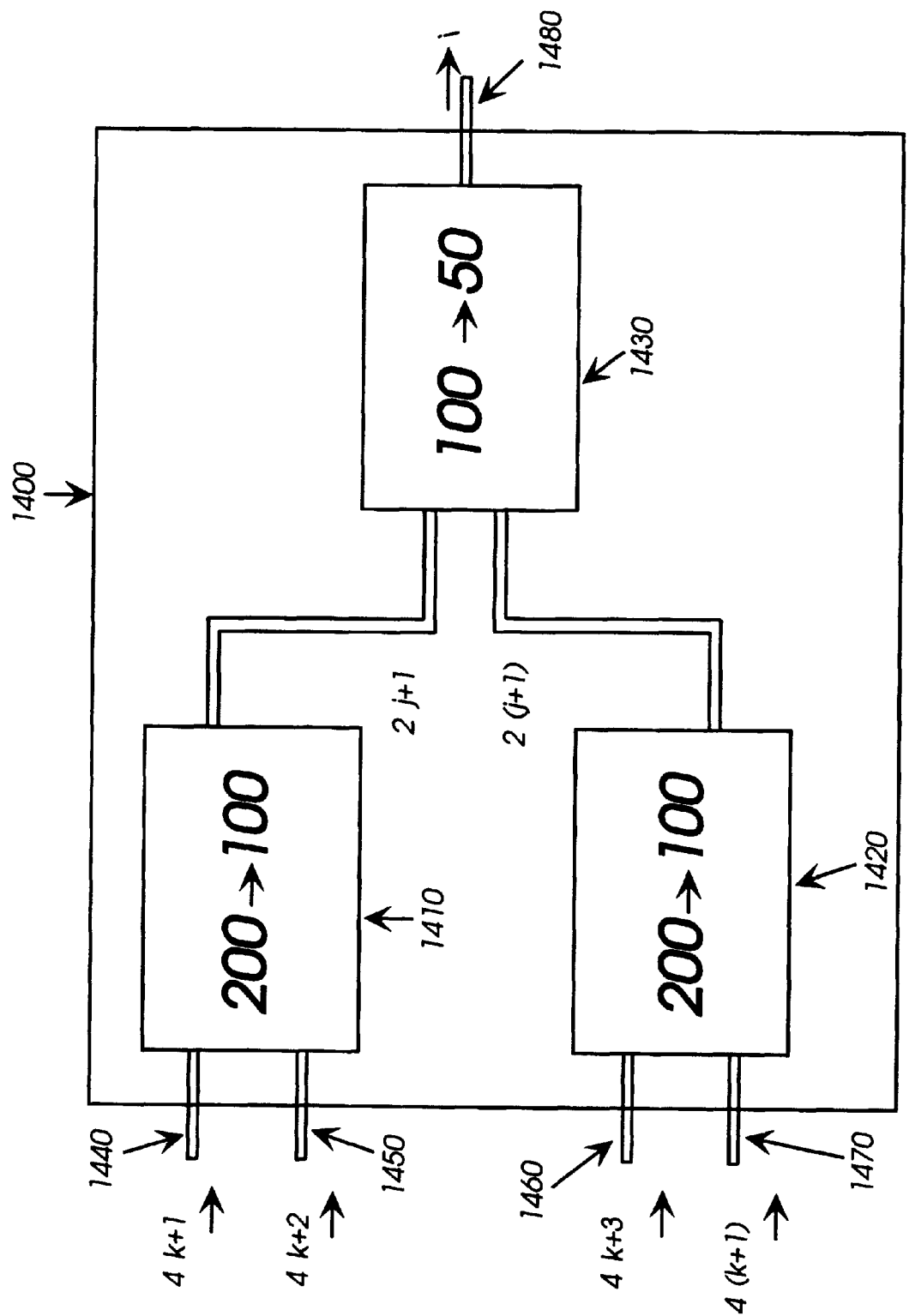
FIG. 14 is a block diagram of an optical interleaver for conversion from an optical channel scheme having 200 GHz spacing to an optical channel scheme having 50 GHz spacing.

FIG. 14 is a block diagram of an optical interleaver for conversion from an optical channel scheme having 200 GHz spacing to an optical channel scheme having 50 GHz spacing. In general, interleaver 1400 includes interleaver 1410 to convert from two sets of 200 GHz spaced channels to one set of 100 GHz spaced channels. Similarly, interleaver 1420 converts from two sets of 200 GHz spaced channels to one set of 100 GHz channels. Interleaver 1430 converts the two sets of 100 GHz spaced channels to one set of 50 GHz spaced channels. Interleaver 1400 allows devices designed for 200 GHz spaced channels to interact with devices or networks designed for 50 GHz spaced channels.

The odd-odd, 4k+1, channels having 200 GHz spacing are input to interleaver 1410 via optical fiber 1440. The odd-even, 4k+2, channels having 200 GHz spacing are input to interleaver 1410 via optical fiber 1450. Interleaver 1410 interleaves the odd-odd channels and the odd-even channels to generate a set of odd, 2j+1, channels having 100 GHz spacing.

The even-odd, 4k+3, channels having 200 GHz spacing are input to interleaver 1420 via optical fiber 1460. The even-even, 4(k+1), channels having 200 GHz spacing are input to interleaver 1420 via optical fiber 1470. Interleaver 1420 interleaves the even-odd channels and the even-even channels to generate a set of even, 2(j+1), channels having 100 GHz spacing.

Interleaver 1430 interleaves the even and odd channels to generate a set of channels, i, having 50 GHz spacing. Thus, interleaver 1400 allows devices designed to operate on optical channels having 200 GHz spacing to interact with devices designed to operate on optical channels having 50 GHz spacing. Other channels spacings can also be supported.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:

a beam splitter;

an etalon optically coupled to the beam splitter, the etalon having a reflective surface and an air gap, the reflective surface to reflect signals passed through the air gap, the etalon further having a tuning plate disposed within the air gap; and a non-linear phase shifter optically coupled to the beam splitter, the non-linear phase shifter to modify a phase of optical signals passed through an air gap of the non-linear phase shifter;

the modified phase of optical signals passed through the non-linear phase shifter and the reflected optical signals reflected by the etalon to cause constructive and destructive optical interference within the beam splitter such that optical signals received via a first port is separated into a first subset and a second subset directed to a second port and the first port, respectively, and further wherein optical signals received via the second port and the first port are combined and directed to the first port.

2. The apparatus of claim 1, wherein the non-linear phase shifter comprises a Fabry-Perot phase shifter.

3. The apparatus of claim 1, wherein the non-linear phase shifter comprises a Michelson interferometer having a Fabry-Perot etalon.

4. The apparatus of claim 3 wherein the non-linear phase shifter air gap is greater than the etalon air gap.

5. The apparatus of claim 3 wherein the etalon air gap is greater than the non-linear phase shifter air gap.

6. The apparatus of claim 3 wherein the non-linear phase shifter air gap is approximately twice the etalon air gap.

7. The apparatus of claim 3 wherein the first reflective surface of the non-linear phase shifter is in the range of 10% to 20% reflective and the second reflective surface of the non-linear phase shifter is in the range of 90% to 100% reflective.

8. The apparatus of claim 1 wherein the reflective surface of the etalon is in the range of 90% to 100% reflective.

9. The apparatus of claim 1 wherein the beam splitter comprises a 50/50 beam splitter.

10. The apparatus of claim 1 wherein components of the beam splitter are maintained in optical contact by atomic force.

11. The apparatus of claim 1 wherein components of the etalon are maintained in optical contact by atomic force.

12. The apparatus of claim 1 wherein components of the non-linear phase shifter are maintained in optical contact by atomic force.

13. The apparatus of claim 1 wherein the etalon is maintained in optical contact with the beam splitter by atomic force.

14. The apparatus of claim 1 wherein the non-linear phase shifter is maintained in optical contact with the beam splitter by atomic force.

15. The apparatus of claim 1 wherein optical signals comprise wavelength division multiplexed (WDM) optical signals of International Telecommunications Union (ITU) channels.

16. The apparatus of claim 1 wherein the first port oriented normal to a first surface of the beam splitter and the second port oriented normal to a second surface of the beam splitter.

17. The apparatus of claim 1 wherein the first port comprises a first collimator oriented at a first predetermined angle with respect to a first surface of the beam splitter and a second collimator oriented at a second predetermined angle with respect to the first surface of the beam splitter, and the second port comprises a third collimator oriented at a third predetermined angle with respect to a second surface of the beam splitter.

18. The apparatus of claim 17 wherein an absolute value of the first, the second and the third predetermined angles are equal.

19. The apparatus of claim 16 wherein the third predetermined angle is 90°.

20. The apparatus of claim 1 wherein the beam splitter is a 50/50 beam splitter cube.

21. The apparatus of claim 1 wherein the beam splitter is a non-50/50 beam splitter.

22. The apparatus of claim 1 wherein the beam splitter is a 50/50 splitter plate.

23. The apparatus of claim 1 wherein the beam splitter is a non-50/50 splitter plate.

24. An apparatus comprising:

means for splitting an optical signal;

means for non-linear phase shifting optical signals received from the means for splitting, the means for non-linear phase shifting optically coupled to the means for splitting; and means for providing a sinusoidal transfer function to operate on optical signals received from the means for splitting, the means for providing the sinusoidal transfer function optically coupled to the means for splitting;

wherein a signal received via a first port is separated into a first subset and a second subset directed to a second port and the first port, respectively, and further wherein optical signals received via the second port and the first port are combined and directed to the first port.

25. The apparatus of claim 24 wherein one or more components of the means for splitting optical signals are maintained in optical contact by atomic force.

26. The apparatus of claim 24 wherein one or more components of the means for non-linear phase shifting are maintained in optical contact by atomic force.

27. The apparatus of claim 24 wherein one or more components of the means for providing a sinusoidal transfer function are maintained in optical contact by atomic force.

28. The apparatus of claim 24 wherein the means for providing a sinusoidal transfer function is maintained in optical contact with the means for splitting optical signals by atomic force.

29. The apparatus of claim 24 wherein the means for non-linear phase shifting is maintained in optical contact with the means for splitting optical signals by atomic force.

30. The apparatus of claim 24 wherein optical signals comprise wavelength division multiplexed (WDM) optical signals of International Telecommunications Union (ITU) channels.

31. The apparatus of claim 24 wherein the first port comprises a first collimator oriented normal to a first surface of the beam splitter and a second collimator oriented normal to a second surface of the beam splitter.

32. The apparatus of claim 24 wherein the first port comprises a first collimator oriented at a first predetermined angle with respect to a first surface of the beam splitter and a second collimator oriented at a second predetermined angle with respect to the first surface of the beam splitter, and the second port comprises a third collimator oriented at a third predetermined angle with respect to a second surface of the beam splitter.

33. The apparatus of claim 32 wherein an absolute value of the first, the second and the third predetermined angles are equal.

34. The apparatus of claim 32 wherein the third predetermined angle is 90°.

35. A method comprising:

abutting an etalon to a beam splitter such that optical contact between the etalon and the beam splitter are maintained by atomic force; and abutting a non-linear phase shifter to the beam splitter such that optical contact between the non-linear phase shifter and the beam splitter are maintained by atomic force.

36. The method of claim 35 further comprising:

attaching a tuning plate holder fixture to the etalon; and attaching a tuning plate to the tuning plate holder fixture such that the tuning plate is disposed within an air gap of the etalon, wherein the tuning plate is rotatable within the air gap.

37. The method of claim 36 further comprising rotating the tuning plate to provide optical tuning.

38. The method of claim 35 wherein abutting the etalon to the beam splitter further comprises:

polishing a first surface of the etalon to a flatness within a predetermined tolerance;

polishing a first surface of the beam splitter to a flatness within the predetermined tolerance; and placing the first surface of the etalon in contact with the first surface of the beam splitter.

39. The method of claim 38 wherein the predetermined tolerance is less than 1.0 μm.

40. The method of claim 35 wherein abutting the non-linear phase shifter to the beam splitter further comprises:

polishing a first surface of the non-linear phase shifter to a flatness within a predetermined tolerance;

polishing a second surface of the beam splitter to a flatness within the predetermined tolerance; and placing the first surface of the non-linear phase shifter in contact with the second surface of the beam splitter.

41. The method of claim 40 wherein the predetermined tolerance is less than 1.0 μm.

42. The method of claim 35 wherein the sub-components of the etalon are maintained in contact with atomic force.

43. The method of claim 42 further comprising:

polishing a first surface of a front plate, a first surface of a back plate, a first end and a second end of first spacer and a first end and a second end of second spacer to a flatness within a predetermined tolerance;

placing the first end of the first spacer in contact with the first surface of the front plate;

placing the first end of the second spacer in contact with the first surface of the front plate;

placing the second end of the first spacer in contact with the first surface of the back plate;

placing the second end of the second spacer in contact with the first surface of the back plate; and applying a reflective coating to the first surface of the back plate.

44. The method of claim 43 wherein the predetermined tolerance is less than 1.0 μm.

45. The method of claim 35 wherein the sub-components of the non-linear phase shifter are maintained in contact with atomic force.

46. The method of claim 45 further comprising:

polishing a first surface of a front plate, a first surface of a back plate, a first end and a second end of first spacer and a first end and a second end of second spacer to a flatness within a predetermined tolerance;

placing the first end of the first spacer in contact with the first surface of the front plate;

placing the first end of the second spacer in contact with the first surface of the front plate;

placing the second end of the first spacer in contact with the first surface of the back plate;

placing the second end of the second spacer in contact with the first surface of the back plate; and applying a reflective coating to the first surface of the back plate.

47. The method of claim 46 wherein the predetermined tolerance is less than 1.0 μm.

48. The method of claim 35 further comprising attaching the etalon, the beam splitter and the non-linear phase shifter to a package.

49. The method of claim 48 further comprising performing temperature cycling.

50. The method of claim 48 further comprising attaching one or more collimators to the package.

51. The method of claim 50 wherein the incident angle of the one or more collimators is modified to provide optical tuning.

* * * * *